(12) United States Patent
Tanabe

(10) Patent No.: US 12,489,388 B2
(45) Date of Patent: Dec. 2, 2025

(54) ELECTRIC-ROTATING-MACHINE CONTROL APPARATUS

(71) Applicant: Mitsubishi Electric Corporation, Tokyo (JP)

(72) Inventor: Hayato Tanabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 171 days.

(21) Appl. No.: 18/398,940

(22) Filed: Dec. 28, 2023

(65) Prior Publication Data

US 2024/0266984 A1 Aug. 8, 2024

(30) Foreign Application Priority Data

Feb. 7, 2023 (JP) ................................ 2023-016691

(51) Int. Cl.
*H02P 29/024* (2016.01)
*H02J 7/00* (2006.01)
(Continued)

(52) U.S. Cl.
CPC ........ *H02P 29/0241* (2016.02); *H02J 7/0063* (2013.01); *H02J 7/14* (2013.01); *H02P 27/06* (2013.01); *H02P 29/68* (2016.02)

(58) Field of Classification Search
CPC .......... H02M 1/327; H02M 1/32; H02M 1/36; H02M 3/155; H02M 7/5387;
(Continued)

(56) References Cited

U.S. PATENT DOCUMENTS

2014/0092655 A1\* 4/2014 Igarashi ................. B60L 3/003
363/56.05
2017/0237381 A1 8/2017 Shinohara
(Continued)

FOREIGN PATENT DOCUMENTS

JP 10-117490 A 5/1998
JP 2007-306640 A 11/2007
(Continued)

OTHER PUBLICATIONS

Japanese Office Action dated Sep. 30, 2025, issued in Japanese application No. 2023-016691.

*Primary Examiner* — Antony M Paul
(74) *Attorney, Agent, or Firm* — Sughrue Mion, PLLC

(57) ABSTRACT

The electric-power conversion apparatus includes an electric-power conversion circuit having two or more legs in each of which there are provided a positive-polarity switching device, a negative-polarity switching device, and an external connection point at which the positive-polarity switching device and the negative-polarity switching device are connected in series with each other and that is connected with an electric rotating machine, a capacitor connected with a positive electrode and a negative electrode, a voltage sensor for detecting a voltage between the positive electrode and the negative electrode, a temperature sensor for detecting a temperature of the electric-power conversion circuit, and a control unit that on/off-controls the switching devices in the electric-power conversion circuit and that performs protective control in the case where a voltage detected by the voltage sensor is larger than a determination voltage calculated based on a temperature detected by the temperature sensor.

15 Claims, 9 Drawing Sheets

(51) Int. Cl.
  *H02J 7/14*   (2006.01)
  *H02P 27/06*  (2006.01)
  *H02P 29/68*  (2016.01)

(58) Field of Classification Search
  CPC .... H02M 7/53871; H02M 3/07; H02M 7/217; H02M 3/3376; H02M 7/53803; B60L 2240/547; B60L 2240/545; B60L 3/003; B60L 58/24; B60L 3/04; B60L 2260/167; B60L 2220/14; B60L 2210/40; B60L 2210/42; B60L 2240/525; B60L 2240/662; B60L 2240/527; B60L 53/55; B60L 9/22; B60L 2240/425; B60L 2240/427; B60L 7/003; B60L 2240/36; H02P 27/06; H02P 29/0241; H02P 27/08; H02P 29/68; H02P 3/18; H02P 29/032; H02P 29/60; H02P 3/22; H02P 29/024; H02P 29/02; H02P 29/027; H02P 2207/05; H02P 25/022; H02P 6/24; H02P 9/30; H02P 25/03; H02P 27/04
  See application file for complete search history.

(56) References Cited

U.S. PATENT DOCUMENTS

2017/0338764 A1   11/2017   Irie et al.
2021/0184620 A1    6/2021   Tanouchi et al.

FOREIGN PATENT DOCUMENTS

| JP | 2009-055676 A | 3/2009 |
| JP | 2017-147806 A | 8/2017 |
| JP | 2017-208990 A | 11/2017 |
| JP | 2021-097476 A | 6/2021 |

* cited by examiner

ELECTRIC-ROTATING-MACHINE CONTROL APPARATUS

TECHNICAL FIELD

The present disclosure relates to an electric-rotating-machine control apparatus.

BACKGROUND

An electric automobile whose driving-force source is an electric rotating machine is known. When an electric automobile travels, an electric rotating machine is operated in a power-running mode so that traveling drive torque is generated; when the electric automobile is in a braking mode, the electric rotating machine is operated in a regenerative mode so that regenerative braking torque is generated.

The driving system of an electric automobile has a DC power source formed of a secondary battery typified by a lithium ion battery. In addition, the driving system has an inverter circuit including a capacitor and two or more semiconductor switches and is connected with the DC power source. Moreover, the driving system has an electric rotating machine connected with the inverter, as a load thereof.

In a driving system utilizing a three-phase synchronous electric rotating machine, an inverter circuit is configured in such a manner that three sets of series circuits, in each of which an upper-side switching device and a lower-side switching device are connected in series with each other, are each connected in parallel with a DC power source. Then, the respective middle points of the three sets of series circuits are connected with the corresponding inputs of a U-phase, a V-phase, and a W-phase of the three-phase synchronous electric rotating machine.

In order to protect a battery, as the DC power source, from an excessive voltage or an excessive current, the driving system of an electric automobile is provided with an opening/closing means for disconnecting the battery from the inverter, as may be necessary. The opening condition for the opening/closing means includes a case where while the electric rotating machine is operated in the regenerative mode, the voltage of the battery becomes the same as or higher than a predetermined value, a case where due to consumption of the battery, the battery voltage becomes the same as or lower than a predetermined value, and a case where the current flowing in the battery becomes the same as or larger than a predetermined value. In addition, there may be the case where due to a failure or a collision of a vehicle, the opening/closing means is opened.

In such a driving system, there may be a case where while the electric rotating machine is operated in the regenerative mode, the opening/closing means is opened and hence the inverter circuit is disconnected from the battery. In addition, even in the case of a driving system having no opening/closing means, there may be a case where due to breakage of a power line between the battery and the inverter circuit, the inverter circuit is disconnected from the battery.

In the case where the inverter circuit is disconnected from the battery, the battery cannot be charged with regenerative electric power that flows from the electric rotating machine to the inverter circuit; thus, the capacitor in the inverter circuit is charged therewith. Therefore, there may be a possibility that excessive voltages are imposed on the capacitor and the switching device and hence the capacitor and the switching device are broken.

In such a case, i.e., in the case where the inverter circuit is disconnected from the DC power source, the input voltage of the inverter circuit becomes a high voltage that cannot be caused in normal operation thereof. Detection of the voltage rise makes it possible to determine disconnection between the inverter circuit and the DC power source. There has been disclosed a technology in which in the case where disconnection between the inverter circuit and the DC power source is determined, there is performed 6-switch opening processing where all the switching devices in the inverter circuit are turned off in order to stop the operation of the inverter. This method makes it possible that the capacitor regenerates no electric power (e.g., Patent Document 1).

Moreover, as one of other measures, there has been disclosed a technology in which in the case where disconnection between the inverter circuit and the DC power source is determined, the 6-switch opening processing is not performed but there is performed three-phase short-circuiting processing where all the upper-side switching devices or all the lower-side switching devices in the inverter circuit are turned on so that each of the phases of the electric rotating machine is short-circuited. This method makes it possible that the capacitor regenerates no electric power (e.g., Patent Document 2).

However, even when any one of the forgoing protective operation items is performed, there is caused a delay between a time point when based on the input voltage of the inverter circuit, it is determined that the inverter circuit has been disconnected from the DC power source and a time point when the protective operation is actually performed. In the delay time, the voltage applied to the capacitor by the inflow of the regenerative electric power continues to rise. Moreover, the inverter circuit continues switching operation until the protection is implemented. Therefore, a switching-time surge voltage added to the capacitor voltage that has risen due to the regenerative electric power is added to the switching device.

Thus, in order to protect the switching device from the excessive voltage, it is required to rapidly determine that the inverter circuit has been disconnected from the DC power source. Accordingly, it is desirable to set the determination voltage for the input voltage of the inverter circuit to a value that is as low as possible.

On the other hand, when the foregoing determination voltage is set to an excessively low value, erroneous detection of an excessive voltage is caused, for example, due to a voltage ripple generated at a time of normal inverter operation, and hence there may be possibility that even in the normal state, the protective operation is performed so as to stop the inverter operation. In order to prevent the inverter from being stopped by the detection like this, it is desirable to set the determination voltage for the input voltage of the inverter circuit to a value that is as high as possible (the determination voltage is utilized for determining that the inverter circuit has been disconnected from the DC power source).

As discussed above, with regard to the determination voltage for the input voltage of the inverter circuit (the determination voltage is utilized for determining that the inverter circuit has been disconnected from the DC power source), there is caused a trade-off relationship between a point of view of rapid protection against an excessive voltage and a point of view of prevention of erroneous detection. In order to satisfy the both items, reduction of a switching surge voltage, reduction of a voltage ripple generated at a time of normal inverter operation, suppression of the inter-terminal voltage of the capacitor at a time of regenerative operation, making the circuit components have high withstanding voltages, and the like are required. These items lead to upsizing of the component size and a price hike and hence downsizing and cost reduction of the inverter circuit become difficult. These items are important issues also at a time when downsizing of an electric-automobile inverter circuit, which is required to be disposed in a limited vehicle space, is realized.

Moreover, the withstanding-voltage performance of a component and the electrostatic capacitance of a capacitor change depending on the temperature of the component. Accordingly, it is required to decide the foregoing determination voltage for the input voltage of the inverter circuit (the determination voltage is utilized for determining that the inverter circuit has been disconnected from the DC power source) in consideration of the state where the withstanding voltage of the component becomes lowest within the operational temperature range and the state where the electrostatic capacitance of the capacitor becomes smallest. In order to securely satisfy the excessive-voltage protection and the erroneous-detection prevention while considering all situations, upsizing and cost rise of the component become necessary.

CITATION LIST

Patent Literature

Patent Document 1: Japanese Patent Application Laid-Open No. H10-117490
Patent Document 2: Japanese Patent Application Laid-Open No. 2021-97476

Each of Patent Documents 1 and 2 discloses a technology in which when disconnection between the inverter circuit and the DC power source has been determined, switching is stopped in order to protect the inverter-circuit components such as the inverter switching devices and the capacitor. However, in deciding a predetermined determination voltage with which the input voltage of the inverter circuit is compared in order to detect disconnection between the inverter circuit and the DC power source, no measures for the trade-off between the rapidity of determination and the prevention of erroneous detection is described.

SUMMARY

The present disclosure has been implemented in order to solve the foregoing problems. The objective thereof is to obtain an electric-rotating-machine control apparatus that can satisfy both the excessive-voltage protection at a time when the inverter circuit has been disconnected from the DC power source and the prevention of inverter operation from being stopped due to erroneous detection, without requiring cost rise due to upsizing of the component and raising the withstanding-voltage performance.

Solution to Problem

An electric-rotating-machine control apparatus according to the present disclosure includes
an electric-power conversion circuit having two or more legs in each of which there are provided a positive-polarity switching device connected with a positive electrode of a DC power source, a negative-polarity switching device connected with a negative electrode of the DC power source, and an external connection point at which the positive-polarity switching device and the negative-polarity switching device are connected in series with each other and that is connected with an electric rotating machine,
a capacitor connected with the positive electrode and the negative electrode of the electric-power conversion circuit,
a voltage sensor for detecting a voltage between the positive electrode and the negative electrode of the electric-power conversion circuit,
a temperature sensor for detecting a temperature of the electric-power conversion circuit, and
a control unit for on/off-controlling the switching devices in the electric-power conversion circuit; in the case where a voltage detected by the voltage sensor is higher than a determination voltage calculated based on a temperature detected by the temperature sensor, the control unit performs protective control in which all the switching devices are turned off, all the positive-polarity switching devices are turned on and all the negative-polarity switching devices are turned off, or all the positive-polarity switching devices are turned off and all the negative-polarity switching devices are turned on.

Advantageous Effects

The present disclosure makes it possible that, by setting the determination voltage while considering the temperature characteristic of a circuit component, there is obtained an electric-rotating-machine control apparatus that can satisfy both the excessive-voltage protection at a time when the inverter circuit has been disconnected from the DC power source and the prevention of inverter operation from being stopped due to erroneous detection, without requiring cost rise due to upsizing of the component and raising the withstanding-voltage performance.

The foregoing and other object, features, aspects, and advantages of the present invention will become more apparent from the following detailed description of the present invention when taken in conjunction with the accompanying drawings.

DESCRIPTION OF EMBODIMENTS

Figure 1:
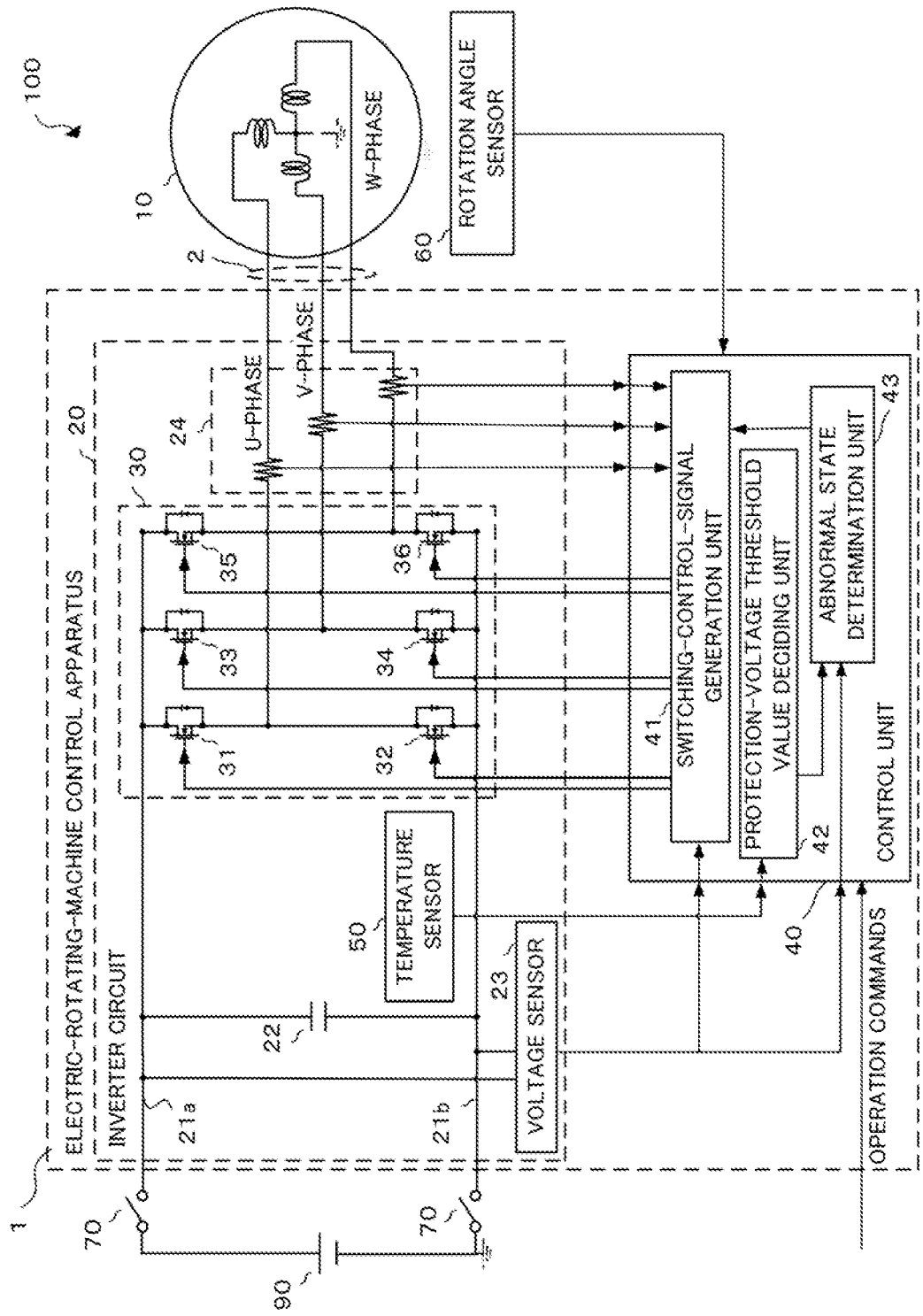
FIG. 1 is a configuration diagram of an electric-rotating-machine control apparatus according to Embodiment 1.

Hereinafter, preferred embodiments of an electric-rotating-machine control apparatus according to the present disclosure will be explained by use of the drawings. The explanation will be made with reference to the drawings, in each of which the same or similar constituent elements are designated by the same reference numerals.

1. Embodiment 1

An electric rotating machine, which is a concept including a motor and a generator, performs power running by converting electric power into driving force. An electric rotating machine can also perform regenerative running by inversely converting driving force into electric power, without changing the structure thereof. A motor has basically the same structure as that of a generator; each of them can perform power running and regenerative running. In the present specification, an electric rotating machine will be explained as a rotating apparatus having the respective functions of a motor and a generator. The electric rotating machine may be replaced by a motor or a generator.

An inverter circuit for driving an electric rotating machine turns on/off two or more semiconductor switches with a predetermined carrier frequency so as to convert DC electric power of a DC power source into AC electric power and to adjust the torque and the rotation speed of the electric rotating machine. Moreover, the electric rotating machine works as a generator, depending on an operational situation, and charges the DC power source with regenerative electric power generated by power generation. In addition, as an electric rotating machine applied to an electric automobile, a high-efficiency permanent-magnet-type three-phase synchronous electric rotating machine is utilized in many cases.

The inverter circuit is provided with a leg in which an upper-side switching device and a lower-side switching device are connected in series with each other. Three legs are configured in such a way as to be connected in parallel with the DC power source; then, the respective middle points of the three sets of series circuits are connected with the corresponding inputs of a U-phase, a V-phase, and a W-phase of the three-phase synchronous electric rotating machine.

The respective phases of the three-phase synchronous electric rotating machine are supplied with AC electric powers whose phases are different by 120° from one another, by sequentially turning on/off the switching devices provided in the respective phases of the inverter circuit, so that the three-phase synchronous electric rotating machine is driven. Hereinafter, unless otherwise stated, the electric rotating machine denotes a three-phase synchronous electric rotating machine. In addition, because the operational principle of an inverter circuit is generally well known, the explanation therefor will be omitted in the present embodiment.

<Configuration of Electric-Rotating-Machine Control Apparatus>

FIG. 1 is a configuration diagram of an electric-rotating-machine control apparatus 1 according to Embodiment 1. In FIG. 1, there is represented a DC power source 90 that supplies DC electric power to an inverter circuit 20 and is charged with regenerative electric power. The DC power source 90 may be, for example, a lead battery or a lithium ion battery. The inverter circuit 20 is connected with the coils of the respective phases of the electric rotating machine 10, which is a control subject. An electric rotating machine apparatus 100 is configured with the whole of the electric-rotating-machine control apparatus 1 and the electric rotating machine 10 that are combined with each other.

The electric-rotating-machine control apparatus 1 is connected with the DC power source 90 through DC bus-bars 21a and 21b, by way of a power switch 70. Then, the DC power source 90 gives driving electric power to the electric-rotating-machine control apparatus 1 or receives regenerative electric power from the electric-rotating-machine control apparatus 1. Moreover, the electric-rotating-machine control apparatus 1 is connected with the electric rotating machine 10 through AC bus-bars 2; the electric-rotating-machine control apparatus 1 gives driving electric power to the electric rotating machine 10 or receives regenerative electric power from the electric rotating machine 10.

The electric rotating machine 10 is provided with a rotation angle sensor 60 for detecting the rotation speed based on the rotation angle of the electric rotating machine 10. The electric rotating machine 10 drives a load to rotate and can regenerate rotation energy of the load, as electric energy. As the electric rotating machine 10, a three-phase brushless motor such as a permanent-magnet three-phase AC synchronous motor is utilized.

The electric-rotating-machine control apparatus 1 includes the inverter circuit 20 and a control unit 40. The inverter circuit 20 includes a capacitor 22 connected between the DC bus-bars 21a and 21b at the input side of the power source, a voltage sensor 23 for detecting the voltage between the DC bus-bars 21a and 21b of the inverter circuit 20, and an electric-power conversion circuit 30. The electric-power conversion circuit 30 includes two or more switching devices 31, 32, 33, 34, 35, and 36. The electric-rotating-machine control apparatus 1 has the electric-power conversion circuit 30 that performs conversion between DC electric power and AC electric power, a current detection unit 24 that detects electric currents flowing in the AC bus-bars 2 of the electric rotating machine 10, and a temperature sensor 50 that detects the temperature of the electric-power conversion circuit 30.

The capacitor 22 has a function of suppressing a ripple in the DC bus-bar voltage, a function of lowering the power-source impedance of the inverter circuit 20 so as to raise the AC current driving capability of the inverter circuit 20, and a function of absorbing a surge voltage. In addition, the voltage sensor 23 divides the voltage between the DC bus-bars 21a and 21b into a voltage, which can be read by the control unit 40, by division resistors, for example, and then outputs DC bus-bar voltage information to the control unit 40.

<Electric-Power Conversion Circuit>

The electric-power conversion circuit 30 is formed of a generally well known circuit in which six switching devices are connected in a full-bridge manner. That is to say, as represented in FIG. 1, the switching device 31 and the switching device 32 are connected in series with each other, the switching device 33 and the switching device 34 are connected in series with each other, and the switching device 35 and the switching device 36 are connected in series with each other; each of the foregoing pairs is connected in parallel with the DC power source 90.

The middle point between the switching device 31 and the switching device 32 is connected with the U-phase winding of the electric rotating machine 10; the middle point between the switching device 33 and the switching device 34 is connected with the V-phase winding of the electric rotating machine 10; the middle point between the switching device 35 and the switching device 36 is connected with the W-phase winding of the electric rotating machine 10. Each of the switching devices 31, 33, and 35 connected with the positive-polarity side of the DC power source 90, i.e., the DC bus-bar 21a will be referred to as an upper-side switching device; each of the switching devices 32, 34, and 36 connected with the negative-polarity side of the DC power source 90, i.e., the DC bus-bar 21b will be referred to as a lower-side switching device. In addition, the pair in which the upper-side switching device and the lower-side switching device are connected in series with each other will be referred to as a leg.

As the switching device, for example, such a MOSFET (Metal-Oxide-Semiconductor Field-Effect-Transistor) as represented in FIG. 1 is generally utilized. Instead of a MOSFET, an IGBT (Insulated Gate Bipolar Transistor) may also be utilized. In addition, a Free Wheel Diode is formed in parallel with each of the MOSFETs as the switching devices (the forward direction thereof is the direction from the negative-polarity side to the positive-polarity side of the DC power source 90, i.e., the direction from the lower side to the upper sided).

The current detection unit 24 detects electric-rotating-machine currents flowing in the AC bus-bars 2 and converts a current into a voltage so as to output electric-rotating-machine current information to the control unit 40. In FIG. 1, as an example, there is represented a configuration in which a current is detected by use of a shunt resistor. In addition, the current detection unit 24 may be a current sensor utilizing a Hall device.

The power switch 70 controls giving and receiving electric power between the DC power source 90 and the electric-rotating-machine control apparatus 1. Specifically, in the case where while the electric rotating machine 10 performs regenerative running, the voltage of the DC power source 90 becomes the same as or higher than a set value, the power switch 70 is controlled to be opened. Moreover, in the case where due to consumption of the DC power source 90, the voltage thereof becomes the same as or lower than the set value, the power switch 70 is controlled to be closed. Furthermore, in the case where the current flowing in the DC power source 90 becomes the same or larger than a set value, in the case where a malfunction of a vehicle is detected, or in the case where a collision of the vehicle is detected, the power switch 70 is controlled to be opened. An unillustrated higher-hierarchy system of the electric-rotating-machine control apparatus 1 controls the power switch 70 to be opened. In addition, it may be allowed that the power switch 70 is controlled by the control unit 40.

The rotation angle sensor 60 detects the rotation angle of the electric rotating machine 10 by use of a resolver or an encoder. The rotation angle of the rotor detected by the rotation angle sensor 60 is outputted to the control unit 40. The rotation angle of the rotor is utilized as a rotation speed.

The temperature sensor 50 is formed of, for example, a thermistor and detects the temperature of the electric-power conversion circuit 30. It may be allowed that the temperature sensor 50 is provided in the inverter circuit 20. In the case where the whole electric-rotating-machine control apparatus 1 is contained in a single case, it may be allowed that the temperature sensor 50 is provided in another place within the case. The temperature detected by the temperature sensor 50 is outputted to the control unit 40. In addition, the temperature sensor 50 may be formed of a diode.

<Control Unit>

The control unit 40 plays a role of controlling the whole electric-rotating-machine control apparatus 1, has a computing processing unit, and performs the respective functions of a switching-control-signal generation unit 41, a protection-voltage threshold value deciding unit 42, and an abnormal state determination unit 43. Moreover, the control unit 40 receives operation commands from the outside. As the operation commands, target torque, a target rotation frequency, a target current, a target voltage, and the like are conceivable.

The switching-control-signal generation unit 41 generates on/off control signals for on/off-controlling the two or more switching devices 31 through 36 included in the electric-power conversion circuit 30. In addition, based on the temperature of the electric-power conversion circuit 30 detected by the temperature sensor 50, the protection-voltage threshold value deciding unit 42 decides a determination voltage for the abnormal state determination unit 43 to determine whether or not an abnormal state (an excessive-voltage state) exists. Hereinafter, the determination voltage will be referred to as a protection-voltage threshold value Vppc.

Based on the DC bus-bar voltage information inputted from the voltage sensor 23 and the protection-voltage threshold value Vppc inputted from the protection-voltage threshold value deciding unit 42, the abnormal state determination unit 43 determines whether or not there exists an abnormality state such as that the DC power source has been disconnected. In the case where it is determined that the DC voltage source is abnormal, protective operation is performed. In this situation, as the protective operation, there are performed the 6-switch opening processing where all the switching devices 31 through 36 of the electric-power conversion circuit 30 are turned off, processing where all the positive-polarity switching devices 31, 33, and 35 are turned on and all the negative-polarity switching devices 32, 34, and 36 are turned off, or processing where all the positive-polarity switching devices 31, 33, and 35 are turned off and all the negative-polarity switching devices 32, 34, and 36 are turned on. These processing items will be referred to also as protective control.

The DC bus-bar voltage information from the voltage sensor 23, rotation angle information (rotation speed) of the electric rotating machine 10 from the rotation angle sensor 60, the electric-rotating-machine current information from the current detection unit 24, and an abnormality-countermeasure processing command from the abnormal state determination unit 43 are inputted to the switching-control-signal generation unit 41. In accordance with these input information items and a torque command value and a current command value, for the electric rotating machine 10, that are inputted, as operation commands, from the outside, the switching-control-signal generation unit 41 outputs on/off control signals for the switching devices 31 through 36 of the electric-power conversion circuit 30.

The switching devices 31 through 36 perform on/off operation in accordance with the respective on/off control signals from the switching-control-signal generation unit 41. Then, DC electric power is converted into AC electric power by the switching devices 31 through 36; the AC electric power is supplied to the electric rotating machine 10. In addition, the switching devices 31 through 36 convert regenerative electric power, which is generated at a time when the electric rotating machine 10 is in a regenerative state, into DC electric power and then charge the DC power source 90 with the DC electric power.

<Hardware Configuration of Control Unit>

Figure 2:
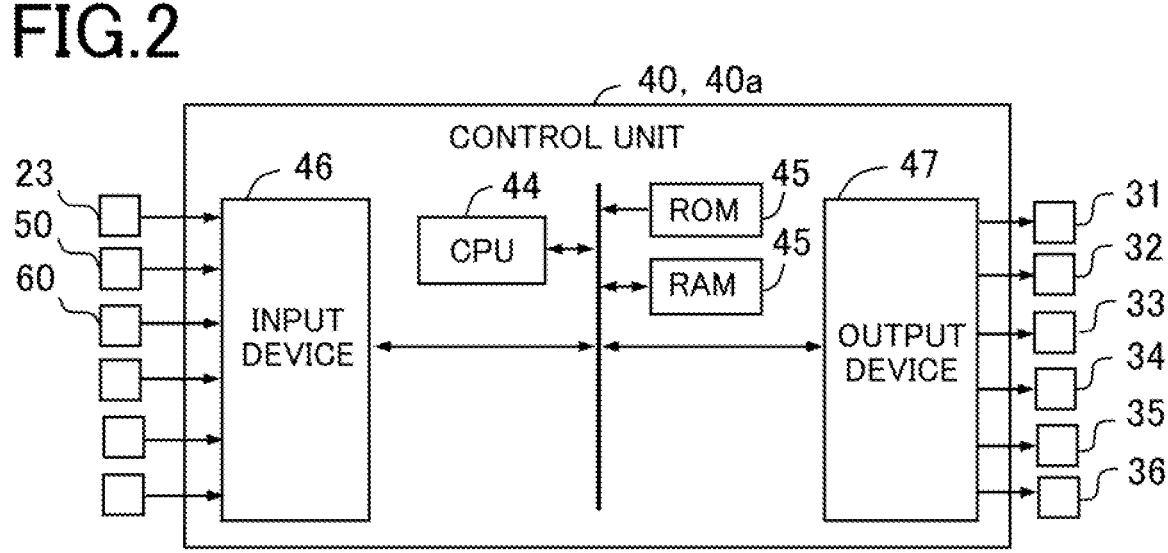
FIG. 2 is a hardware configuration diagram of a control unit in the electric-rotating-machine control apparatus according to Embodiment 1.

FIG. 2 is a hardware configuration diagram of the control unit 40 in the electric-rotating-machine control apparatus 1 according to Embodiment 1. The hardware configuration diagram in FIG. 2 can be applied also to a control unit 40a. In the present embodiment, as the representative apparatus thereof, the control unit 40 will be explained. In the present embodiment, the respective functions of the control unit 40 are realized by processing circuits provided in the control unit 40. Specifically, as illustrated in FIG. 2, the control unit 40 includes, as the processing circuits, a computing processing unit (computer) 44 such as a CPU (Central Processing Unit), storage apparatuses 45 that exchange data with the computing processing unit 44, an input device 46 that inputs external signals to the computing processing unit 44, an output device 47 that outputs signals from the computing processing unit 44 to the outside, and the like.

It may be allowed that as the computing processing unit 44, an ASIC (Application Specific Integrated Circuit), an IC (Integrated Circuit), a DSP (Digital Signal Processor), an FPGA (Field Programmable Gate Array), one of various kinds of logic circuits, one of various kinds of signal processing circuits, or the like is provided. In addition, it may be allowed that as the computing processing unit 44, two or more computing processing units of the same type or different types are provided and respective processing items are executed in a sharing manner. As the storage apparatuses 45, there are provided a RAM (Random Access Memory) that can read data from and write data in the computing processing unit 44, a ROM (Read Only Memory) that can read data from the computing processing unit 44, a flash memory, and the like. The input device 46 is connected with various kinds of sensors such as the voltage sensor 23, the temperature sensor 50, and the rotation angle sensor 60 and with switches and is provided with an A/D converter and the like for inputting the output signals from the sensors and the switches to the computing processing unit 44. The output device 47 is connected with electric loads such as the switching devices 31 through 36 and is provided with a driving circuit and the like for converting and outputting a control signal from the computing processing unit 44 to the electric loads.

The computing processing unit 44 runs software items (programs) stored in the storage apparatus 45 such as a ROM and collaborates with other hardware devices in the control unit 40, such as the storage apparatus 45, the input device 46, and the output device 47, so that the respective functions provided in the control unit 40 are realized. Setting data items such as a threshold value and a determination value to be utilized in the control unit 40 are stored, as part of software items (programs), in the storage apparatus 45 such as a ROM. The functions of the constituent elements of the control unit 40 will be explained. It may be allowed that the respective functions of the control unit 40 are configured with either software modules or combinations of software and hardware. It may be allowed that the software is either a firmware incorporated in the apparatus or a type of software that is read from the outside each time it is executed and that is frequently updated.

<Function of Control Unit>

The computing processing unit 44 reads and executes processing programs stored in the storage apparatuses 45 so as to realize the respective functions of the units in the control unit 40. That is to say, in the control unit 40, the computing processing unit 44 performs a processing process for making the abnormal state determination unit 43 and the switching-control-signal generation unit 41 receive the input signal from the voltage sensor 23 that detects the DC bus-bar voltage of the inverter circuit 20. Moreover, in the control unit 40, the computing processing unit 44 performs a processing process for making the switching-control-signal generation unit 41 receive the signal inputs from the current detection unit 24 that detects AC bus-bar currents of the inverter circuit 20 and from the rotation angle sensor 60 that detects the rotation angle of the electric rotating machine 10.

Still moreover, in the control unit 40, the computing processing unit 44 performs a processing process for making the protection-voltage threshold value deciding unit 42 receive the signal input from the temperature sensor 50 that detects the temperature of the electric-power conversion circuit 30. Still moreover, in the control unit 40, the computing processing unit 44 performs a processing process for making the abnormal state determination unit 43 output the abnormality-countermeasure processing command to the switching-control-signal generation unit 41. Furthermore, in the control unit 40, the computing processing unit 44 performs a processing process for outputting the on/off signals generated by the switching-control-signal generation unit 41 to the switching devices of the electric-power conversion circuit 30, by way of the output device 47. The programs related to these processing processes to be performed are stored in the storage apparatuses 45.

It may also be said that these programs are the ones for making the computer execute the operation procedure or operation method of the control unit 40. In this situation, as the storage apparatuses 45, a nonvolatile or volatile semiconductor memory such as an EPROM or an EEPROM, a magnetic disk, a flexible disk, an optical disk, a compact disk, a minidisk, a DVD, or the like may be utilized, instead of a RAM, a ROM, and a flash memory.

In addition to the programs for performing the foregoing processing processes, the storage apparatuses 45 stores data obtained from a higher-hierarchy system, data at a time when an abnormality occurs, and the results of processing of these data pieces. The input device 46 corresponds to part of the functions of the switching-control-signal generation unit 41, the protection-voltage threshold value deciding unit 42, and the abnormal state determination unit 43 and obtains information pieces outputted from an unillustrated higher-hierarchy system. The output device 47 corresponds to part of the functions of the switching-control-signal generation unit 41.

The electric-rotating-machine control apparatus 1 according to Embodiment 1 is characterized in that the protection-voltage threshold value deciding unit 42 is provided in the control unit 40 and in that the protection-voltage threshold value Vppc for determining whether or not the power source side is abnormal is decided based on the temperature of the electric-power conversion circuit 30 obtained by the temperature sensor 50.

This configuration it possible to satisfy both prevention of the switching device from being broken by an excessive voltage at a time when the inverter circuit 20 has been disconnected from the DC power source 90 and prevention of inverter operation from being stopped due to erroneous detection. In this situation, no cost rise, caused by upsizing of the component and raising the withstanding-voltage performance of the component, is required. Hereinafter, the configuration will be explained more in detail.

As described above, the case is conceivable where while the electric rotating machine 10 is operated in the regenerative mode, the power switch 70 is opened. Moreover, the case is conceivable where due to breakage of the power line between the DC power source 90 and the inverter circuit 20, the inverter circuit 20 is disconnected from the DC power source 90. In these cases, the DC power source 90 cannot be charged with the regenerative electric power that flows into the inverter circuit 20 and hence the capacitor 22 of the inverter circuit 20 is charged therewith. As a result, it is conceivable that there is caused a problem that the voltage to be applied to the capacitor 22 rises and hence the components in the inverter circuit, such as the switching device and the capacitor, are broken by an excessive voltage.

As the measures therefor, there is a method in which when the voltage value detected by the voltage sensor 23 exceeds the protection-voltage threshold value Vppc, it is determined that the power source side is abnormal and then protective operation for stopping the inverter operation is performed. As the protective operation, for example, there are the 6-switch opening processing where all the switching devices 31 through 36 of the electric-power conversion circuit 30 are turned off, processing where all the positive-polarity switching devices 31, 33, and 35 are turned on and all the negative-polarity switching devices 32, 34, and 36 are turned off, or processing where all the positive-polarity switching devices 31, 33, and 35 are turned off and all the negative-polarity switching devices 32, 34, and 36 are turned on.

<Behavior of Power-Source Voltage During Protective Operation>

Figure 3:
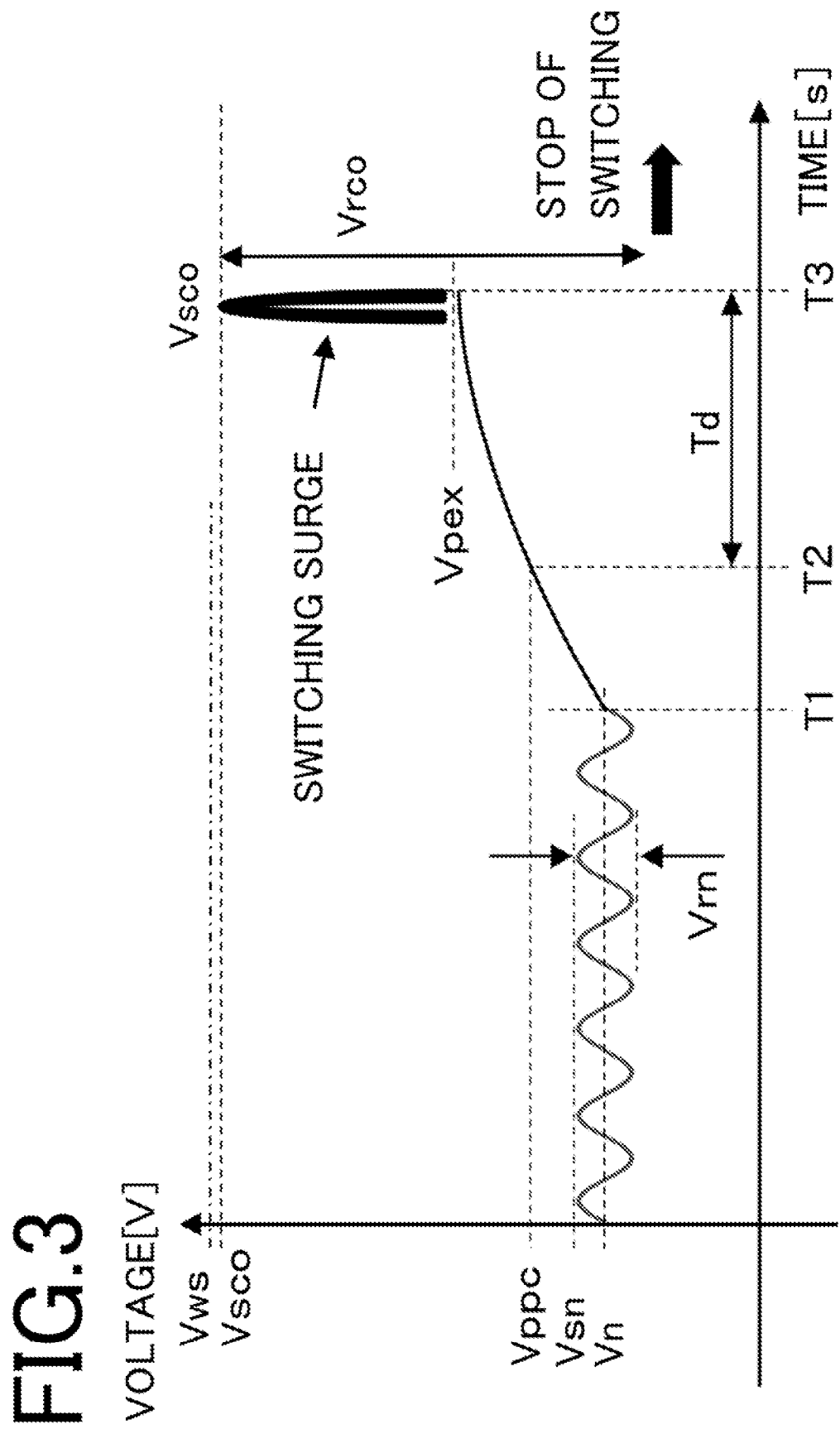
FIG. 3 is a time chart representing a DC bus-bar voltage at a time when the electric-rotating-machine control apparatus according to Embodiment 1 performs protective operation.

FIG. 3 is a time chart representing a DC bus-bar voltage Vdc applied between the DC bus-bars 21a and 21b at a time when the electric-rotating-machine control apparatus 1 according to Embodiment 1 performs protective operation. The ordinate denotes the voltage [V], and the abscissa denotes the time [s]. At a time point T1, the DC power source 90 is disconnected. At a time point T2, the control unit 40 detects that the DC bus-bar voltage Vdc detected by the voltage sensor 23 has exceeded the protection-voltage threshold value Vppc. The control unit 40 performs the protective operation so as to instruct the switching device to stop its switching operation. At a time point T3, this protective operation is performed. After the time point T3, the switching operation by the switching device is stopped. The time point T3 is referred to also as a protective-control performing time point.

The characteristics of the sensor, the control circuit, and the like cause a delay time Td from the time point when the control unit 40 determines that the DC voltage source side is abnormal to the time point when the control unit 40 performs the protective operation. Because regenerative electric power flows into the capacitor 22 during the delay time Td, the DC bus-bar voltage Vdc applied to the capacitor 22 continue to rise. At the time point T3, the DC bus-bar voltage Vdc rises up to a protective-operation performing time DC voltage Vpex.

Until performing the protective operation, the control unit 40 keeps the electric-power conversion circuit 30 continuing the inverter operation. Accordingly, a surge voltage due to the switching operation is generated across each of the switching devices 31 through 36; as a maximum applying voltage, a DC-power-source disconnecting time surge voltage Vsco obtained by adding the protective-operation performing time DC voltage Vpex, which is the capacitor voltage raised by the regenerative electric power, and a surge voltage width Vrco caused by the switching is applied to each of the switching devices.

In order to protect the switching device from the excessive voltage, it is required that when the regenerative running is performed with the maximum regenerative electric power, the rise in the capacitor voltage after the occurrence of an abnormality and the effect of the switching surge are considered. The protection-voltage threshold value Vppc needs to be set in consideration of these matters so that the voltage to be applied to each of the components does not exceed the withstanding voltage thereof.

<Normal-Time Ripple>

Meanwhile, when the inverter normally operates, the voltage to be applied to the capacitor 22 is the one obtained by superimposing a normal-time ripple voltage width Vrn, caused by the inverter operation of the inverter circuit 20, on a normal-time DC power source voltage Vn to be supplied from the DC power source 90. In the case where the ripple-superimposed capacitor voltage (ripple-applied normal-time maximum voltage Vsn) exceeds the foregoing protection-voltage threshold value Vppc, it is determined that an abnormal state exists, despite the normal power source side, and then the inverter operation is stopped through the protective operation.

In order to prevent this kind of erroneous detection, it is required to set the protection-voltage threshold value Vppc in such a way that even in the case where when the maximum voltage is supplied from the DC power source 90, the maximum voltage ripple is superimposed, the voltage applied to the capacitor 22 does not exceed the protection-voltage threshold value Vppc.

In other words, it is required that the protection-voltage threshold value Vppc is set between the upper limit value decided in terms of excessive-voltage protection and the lower limit value decided in terms of erroneous-detection prevention. FIG. 3 represents the behavior of the inverter circuit at a time when the protection-voltage threshold value Vppc is set near the upper limit of the foregoing settable range of the protection-voltage threshold value Vppc. The lower limit of the protective-voltage threshold value is the ripple-applied normal-time maximum voltage Vsn. After the DC power source 90 is disconnected, the DC bus-bar voltage Vdc rises up to the DC-power-source disconnecting time surge voltage Vsco. In FIG. 3, the DC-power-source disconnecting time surge voltage Vsco reaches a voltage close to a switching-device withstanding voltage Vws. When the protection-voltage threshold value Vppc is the upper limit of the protective-voltage threshold value, the DC-power-source disconnecting time surge voltage Vsco reaches the switching-device withstanding voltage Vws.

It is required that the protection-voltage threshold value Vppc is set between the upper limit of the protective-voltage threshold value and the lower limit of the protective-voltage threshold value. However, the case may be conceivable where, for example, the relationship between the upper and lower limits is reversed and hence the protection-voltage threshold value Vppc cannot be set. In that case, it is required that the upper limit value of the protection-voltage threshold value Vppc is raised by reducing the switching surge, by suppressing the capacitor voltage from rising, and by strengthening the withstanding voltage of the component or that the lower limit value of the protection-voltage threshold value Vppc is lowered by reducing the voltage ripple.

In this situation, the theoretical formula for a switching surge Vsurge that largely contributes to deciding the protection-voltage threshold value Vppc is expressed by the equation (1). In addition, the equation (2) represents the theoretical formula for the maximum voltage Vcharge that has risen due to regenerative electric power after the DC power source 90 has been disconnected and an abnormality has occurred at the power source side and that is applied to the capacitor. In addition, the theoretical formula for the voltage ripple Vripple is expressed by the equation (3).

$$Vsurge = Ls \times di/dt \qquad (1)$$

$$Vcharge = \sqrt{(2P/C \times Td + Vppc^2)} \qquad (2)$$

$$Vripple = 1/C \int Icapdt \qquad (3)$$

Definition of Variable:
 Ls: loop inductance
 di/dt: current inclination at a time of switching
 P: regenerative electric power
 C: electrostatic capacitance of capacitor
 Td: delay time
 Vppc: protection-voltage threshold value
 Lcap: capacitor current The equation (1) makes it possible to calculate the voltage jump based on the current inclination di/dt at a time of switching and the inductance Ls. The switching surge in FIG. 3 can be obtained by the equation (1).

The equation (2) makes it possible to calculate the voltage that rises during the delay time Td, due to the regenerative electric power flowing into the capacitor, after the DC bus-bar voltage Vdc has risen up to the protection-voltage threshold value Vppc. The equation (2) makes it possible to calculate the protective-operation performing time DC voltage Vpex in FIG. 3.

The equation (3) makes it possible to calculate the change, in the DC bus-bar voltage Vdc, that is caused because a current flows into the capacitor at a time of the normal switching operation. The equation (3) makes it possible to calculate the normal-time ripple voltage width Vrn in FIG. 3.

<Temperature Characteristic of Switching Device>

Figure 4:
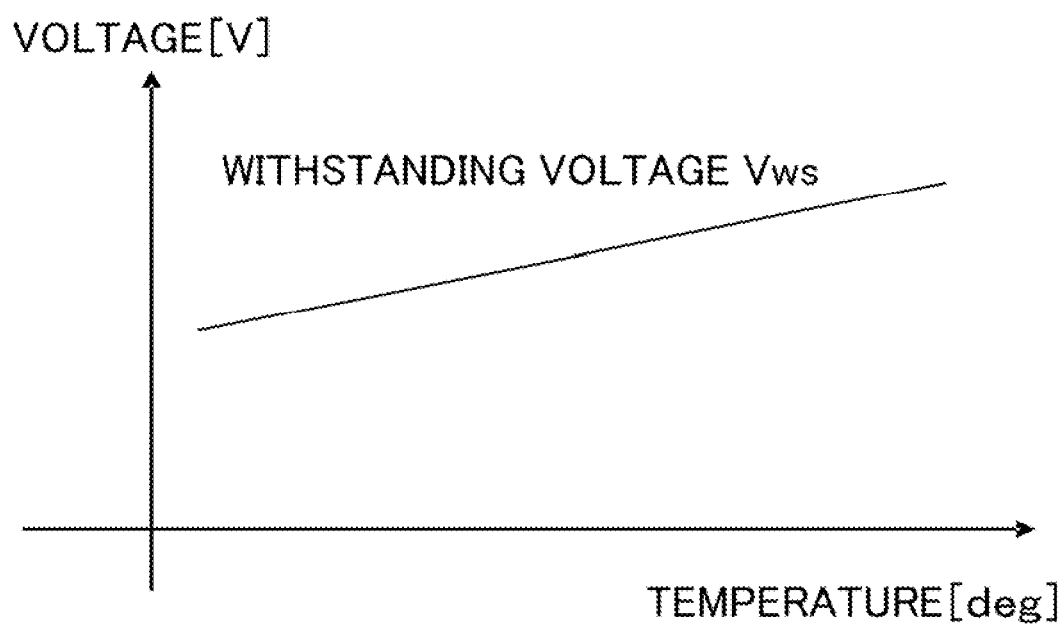
FIG. 4 is a graph representing the temperature characteristic of the withstanding voltage of a switching device in the electric-rotating-machine control apparatus according to Embodiment 1.

FIG. 4 is a graph representing the temperature characteristic of the withstanding voltage of the switching device in the electric-rotating-machine control apparatus 1 according to Embodiment 1. The ordinate denotes the voltage [V], and the abscissa denotes the temperature [deg]. There is exemplarily represented a graph showing the relationship between the temperature and the withstanding voltage of the switching device utilized in the electric-power conversion circuit 30.

In general, the higher becomes the temperature of a semiconductor switching device, the higher the withstanding voltage thereof becomes; the lower becomes the temperature of the semiconductor switching device, the lower the withstanding voltage thereof becomes. Accordingly, the lower becomes the temperature of the switching device, the lower the upper limit value of the protection-voltage threshold value Vppc becomes.

<Temperature Characteristic of Capacitor>

Figure 5:
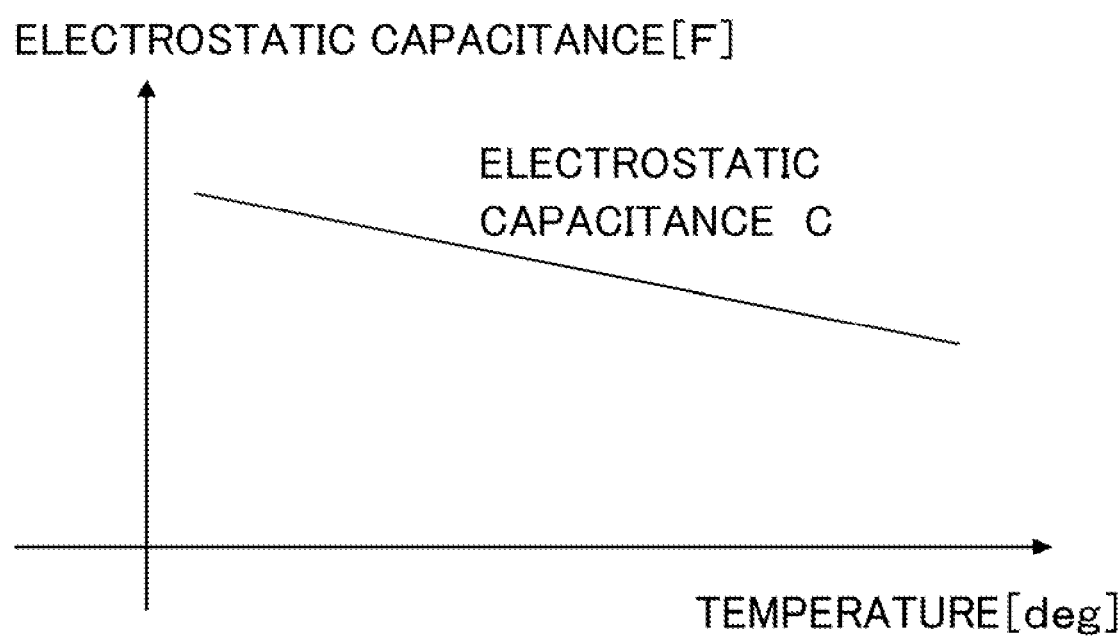
FIG. 5 is a graph representing the temperature characteristic of the capacitance of a capacitor in the electric-rotating-machine control apparatus according to Embodiment 1.

FIG. 5 is a graph representing the temperature characteristic of the capacitance of the capacitor in the electric-rotating-machine control apparatus 1 according to Embodiment 1. The ordinate denotes the electrostatic capacitance [F], and the abscissa denotes the temperature [deg]. In many cases, a film capacitor made of polypropylene, as the base material, is utilized in the inverter circuit 20 to be mounted in the driving system of an electric automobile. There is exemplarily represented a graph showing the relationship between the temperature and the electrostatic capacitance C of a film capacitor made of polypropylene, as the base material.

In general, the higher becomes the temperature of the device, the lower the electrostatic capacitance C of a film capacitor utilizing polypropylene becomes; the lower becomes the temperature of the device, the higher the electrostatic capacitance C thereof becomes. Accordingly, the higher becomes the temperature of the device, the larger a voltage ripple caused by inverter operation becomes; the lower becomes the temperature of the device, the smaller the voltage ripple becomes. As a result, the higher becomes the temperature of the device, the higher the lower limit value of the protection-voltage threshold value Vppc becomes.

There will be considered the case where in the electric-rotating-machine control apparatus 1, the protection-voltage threshold value Vppc is a preliminarily set fixed value. In that case, it is required that under every condition, both prevention of the switching device from being broken by an excessive voltage and prevention of inverter operation from being stopped due to erroneous detection are satisfied. For that purpose, it is required that while considering the foregoing changes in the characteristics due to the component temperature, the protection-voltage threshold value Vppc is set in such a way as to be established under the conditions in which the characteristics become lowest.

In other words, the upper limit value of the protection-voltage threshold value Vppc to be decided in terms of excessive-voltage protection needs to be decided at a low temperature where the switching-device withstanding voltage Vws is lowest. Then, the lower limit value of the protection-voltage threshold value Vppc to be decided in terms of erroneous-detection prevention needs to be decided at a high temperature where the electrostatic capacitance C of the capacitor is low and hence the voltage ripple becomes large.

In order to appropriately set the protection-voltage threshold value Vppc under the foregoing restriction, it is required, as can be comprehended from the foregoing theoretical formulas (1) through (3), to increase the electrostatic capacitance C of the capacitor, to strengthen the component withstanding voltage, to reduce the switching speed, and the like. Promotion of these items leads to upsizing of the components and the cost hike. Although decrease in the switching speed leads to reduction of a surge because of the reduction of di/dt, increase in the switching loss is caused and hence the electric-power conversion efficiency is deteriorated and the heat-generation amount increases. Accordingly, upsizing of the components and the cost hike are caused.

<Processing for Excessive-Voltage Protection Operation>

Figure 6:
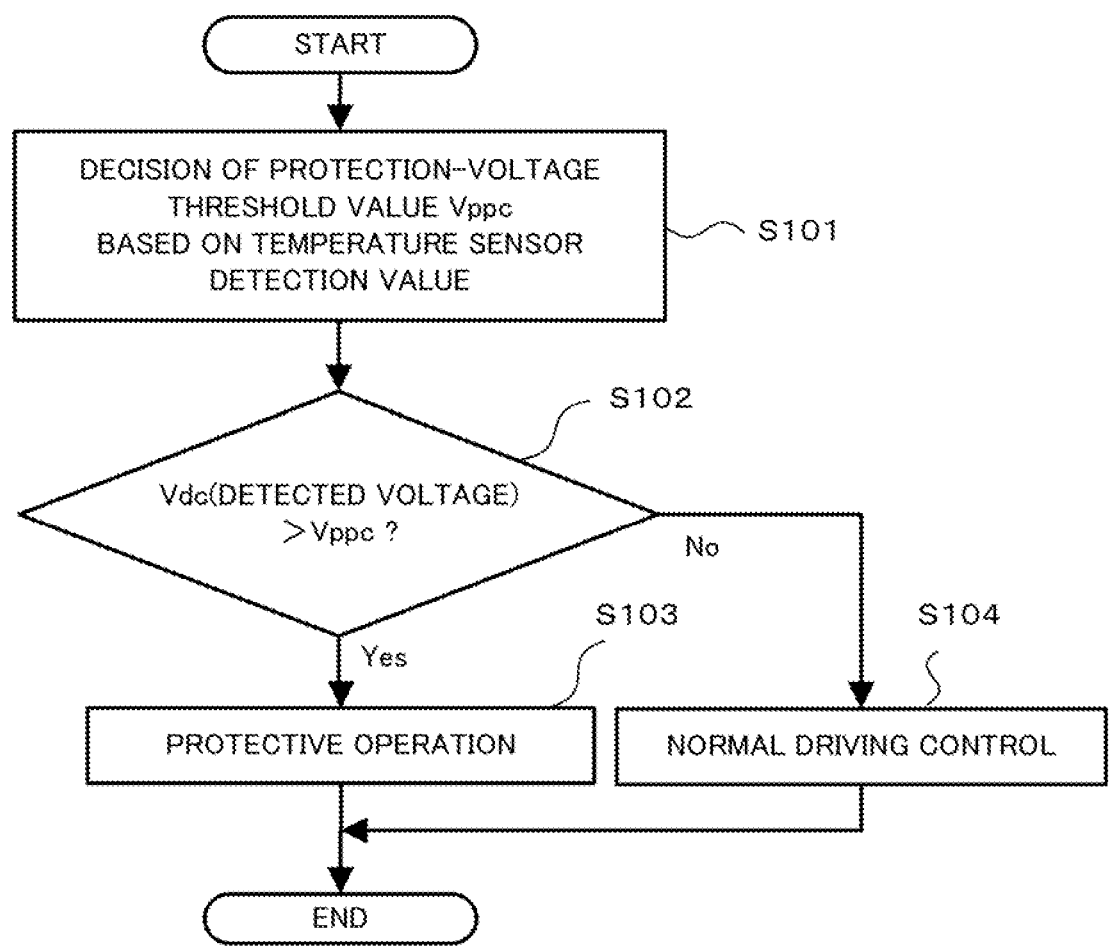
FIG. 6 is a flowchart representing processing by the control unit in the electric-rotating-machine control apparatus according to Embodiment 1.

FIG. 6 is a flowchart representing processing by the control unit 40 of the electric-rotating-machine control apparatus 1 according to Embodiment 1. FIG. 6 represents processing for excessive-voltage protection operation to be executed by the computing processing unit 44 of the control unit 40. This processing may be executed every predetermined time (e.g., every 1 ms). It may be allowed that the process is executed not every predetermined time but at each time of events such as that A/D conversion of each of the signals detected by the voltage sensor 23 and the temperature sensor 50 is completed.

In the step S101 after the start of processing in FIG. 6, the protection-voltage threshold value deciding unit 42 decides the protection-voltage threshold value Vppc. The protection-voltage threshold value Vppc is decided based on a detection value of the temperature sensor 50 that detects the temperature of the electric-power conversion circuit 30.

In the step S102, the abnormal state determination unit 43 determines whether or not the DC bus-bar voltage Vdc detected by the voltage sensor 23 is larger than the protection-voltage threshold value Vppc. In the case where the DC bus-bar voltage Vdc is larger than the protection-voltage threshold value Vppc (the determination result is Yes), the protective operation is performed in the step S103; then, the processing is ended. In the case where the DC bus-bar voltage Vdc is not larger than the protection-voltage threshold value Vppc (the determination result is No), normal driving control is performed in the step S104; then, the processing is ended. With the determination in the step S102, the determination value may have a hysteresis.

In the step S102, it is determined whether or not the abnormal state of the power source side is the one where the DC power source 90 cannot be charged with regenerative electric power. Specifically, in the case where the DC bus-bar voltage Vdc detected by the voltage sensor 23 is larger than the protection-voltage threshold value Vppc decided by the protection-voltage threshold value deciding unit 42, the abnormal state determination unit 43 determines that the power source side is abnormal and the DC power source 90 cannot be charged with regenerative electric power. In any other cases, it is determined that the power source side is normal.

When the electric rotating machine 10 is operated in a regenerative manner, while the power switch 70 is opened, the capacitor 22 is charged with regenerative electric power. Then, the both-end voltage of the capacitor 22, i.e., the DC bus-bar voltage Vdc becomes a high voltage that does not generated in the normal operation. In addition, in some cases, even when the power switch 70 is conductive, the DC power source 90 becomes a high voltage that cannot be generated in the normal operation. In the case where as described above, the DC power source 90 cannot be charged with regenerative electric power, it can be determined that the power source side is abnormal.

In the case where the abnormal state determination unit 43 determines an abnormal state, an abnormality-countermeasure processing command is outputted to the switching-control-signal generation unit 41. The switching-control-signal generation unit 41 performs the 6-switch opening processing and the like.

In the case where the abnormal state determination unit 43 determines that the power source side is normal, normal driving control is performed. In this situation, the electric rotating machine 10 is in the state where it can be operated in a power running manner or in a regenerative manner. The abnormal state determination unit 43 does not output the abnormality-countermeasure processing command to the switching-control-signal generation unit 41. In the case where the abnormal state determination unit 43 does not input the abnormality-countermeasure processing command to the switching-control-signal generation unit 41, normal driving control of the inverter circuit is performed.

In the case of the normal driving control, the target torque or the target current of the electric rotating machine 10, as the operation command, is inputted through a communication line, from other control apparatuses such as an unillustrated vehicle ECU (Electronic Control Unit) and the like. Then, the switching-control-signal generation unit 41 performs the current feedback control by use of the DC bus-bar voltage information inputted from the voltage sensor 23, the rotation angle information of the electric rotating machine 10, inputted from the rotation angle sensor 60, and the electric-rotating-machine current information inputted from the current detection unit 24. The switching-control-signal generation unit 41 calculates on/off control signals for the switching devices 31 through 36 of the electric-power conversion circuit 30 so that the target torque or the target current of the electric rotating machine 10 can be obtained, and then outputs the on/off control signals to the electric-power conversion circuit 30. In addition, because the current feedback control is publicly known, the detailed explanation therefor will be omitted here.

<Setting of Protection-Voltage Threshold Value>

The protection-voltage threshold value Vppc to be decided by the protection-voltage threshold value deciding unit 42 is set higher, as the temperature of the electric-power conversion circuit 30, obtained by the temperature sensor 50, becomes higher. As described above, the switching-device withstanding voltage Vws has a positive correlation with the temperature. In addition, the voltage ripple to be superimposed on the voltage applied to the capacitor also has a positive correlation with the temperature. The upper and lower limits of the protection-voltage threshold value Vppc, to be decided based on these items, each have a positive correlation with the temperature. Accordingly, as the temperature of the electric-power conversion circuit 30 becomes higher, the protection-voltage threshold value Vppc is set to a higher value. In contrast to the case where the protection-voltage threshold value Vppc is a preliminarily set fixed value, this method makes it possible to satisfy both the prevention of the switching device, the capacitor, and the like from being broken by an excessive voltage and the prevention of inverter operation from being stopped due to erroneous detection, without requiring cost rise due to upsizing of the component and raising the withstanding-voltage performance.

Figure 7:
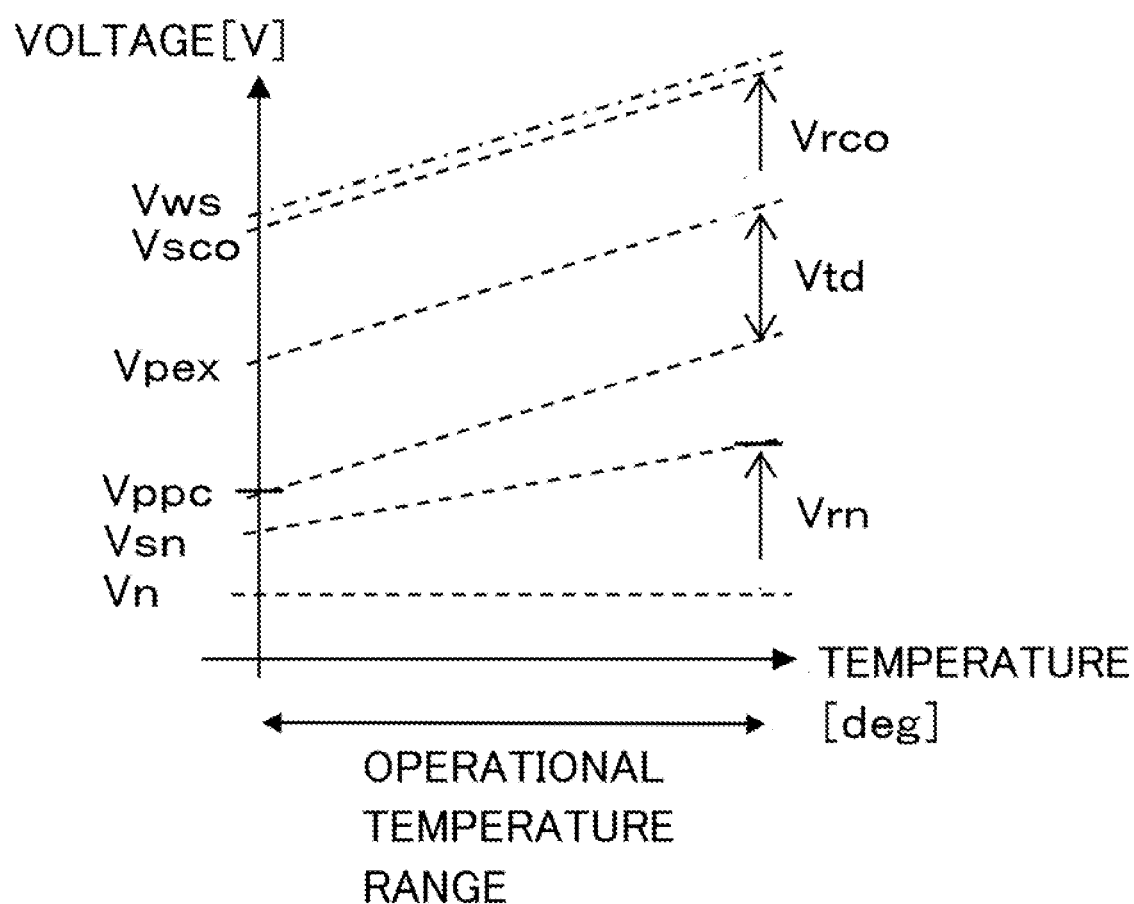
FIG. 7 is a graph representing setting of a protection-voltage threshold value in the electric-rotating-machine control apparatus according to Embodiment 1.

FIG. 7 is a graph representing setting of the protection-voltage threshold value Vppc in the electric-rotating-machine control apparatus 1 according to Embodiment 1. In FIG. 7, the DC-power-source disconnecting time surge voltage Vsco has a value close to the switching-device withstanding voltage Vws. Accordingly, the protection-voltage threshold value Vppc set in FIG. 7 is a value close to the upper limit of the protection-voltage threshold value. The ripple-applied normal-time maximum voltage Vsn corresponds to the lower limit value of the protection-voltage threshold value Vppc. The reason why the above setting is made is because when the protection-voltage threshold value Vppc is set to a value lower than this, it is determined that the fluctuation in the bus-bar voltage, caused by the ripple voltage generated by the normal inverter operation, is abnormal.

In the example represented in FIG. 7, when without changing the parameters in accordance with the temperature, a constant protection-voltage threshold value Vppc is set, the upper limit of the protective-voltage threshold value at a low temperature within the operational temperature range becomes smaller than the ripple-applied normal-time maximum voltage Vsn. That is to say, the protection-voltage threshold value Vppc, as a single fixed value, cannot be set. This is because it becomes impossible to satisfy both the protection against an excessive voltage and the erroneous-detection prevention.

The protective-operation performing time DC voltage Vpex is the DC voltage that has risen until the switching operation by the switching device is completely stopped in the delay time Td after an excessive voltage is detected with the protection-voltage threshold value Vppc and then the excessive-voltage protection operation is performed. The DC-power-source disconnecting time surge voltage Vsco is the voltage obtained by adding the DC-power-source disconnecting time surge voltage Vsco to the protective-operation performing time DC voltage Vpex. The rising voltage at a time when in the delay time Td, the voltage of the DC power source 90 rises from the protection-voltage threshold value Vppc to the protective-operation performing time DC voltage Vpex is represented as a delay-time rising voltage Vtd.

In order to cope with this situation while keeping the protection-voltage threshold value Vppc as a single fixed value, it is required to lower the ripple-applied normal-time maximum voltage Vsn by increasing the size of the capacitor or to raise the withstanding-voltage performance of the switching device, which is accompanied by a cost hike. In order to lower the surge voltage, the switching speed can also be reduced. This is because the reduction of the switching speed results in reduction of a surge due to decrease in di/dt. However, the reduction of the switching speed is accompanied by an increase in the switching loss and hence results in deterioration of the electric-power conversion efficiency and an increase in the heat-generation amount. Accordingly, upsizing of the components and the cost hike are caused. However, such a problem can be solved by deciding the protection-voltage threshold value Vppc, based on the temperature of the electric-power conversion circuit 30. As the temperature rises, the protection-voltage threshold value Vppc is set to a higher value, so that both the protection against an excessive voltage and the erroneous-detection prevention can be satisfied, without requiring upsizing of the component.

In this situation, in consideration of a rise in the capacitor voltage due to regenerative electric power at a time when an abnormality is caused by disconnection of the DC power source 90 and the effect of a switching surge, the protection-voltage threshold value Vppc is set to an upper limit value with which the DC-power-source disconnecting time surge voltage Vsco, which is the maximum value of the voltage to be applied to the switching device, does not exceed the switching-device withstanding voltage Vws corresponding to the obtained temperature of the electric-power conversion circuit 30. This makes it possible to reduce the electrostatic capacitance C of the capacitor to a minimum, while securely protecting the components from an excessive voltage; thus, it is made possible to suppress the cost from increasing due to upsizing of the component and raising the withstanding-voltage performance.

As described above, in the electric-rotating-machine control apparatus 1 according to Embodiment 1, the protection-voltage threshold value Vppc can be set in accordance with the withstanding voltage Vws of the component corresponding to the temperature of the electric-power conversion circuit 30. Moreover, in a low-temperature region where although the switching-device withstanding voltage Vws is low, the ripple-applied normal-time maximum voltage Vsn is also low because the voltage ripple is small, there is no possibility that erroneous detection stops the operation; therefore, the protection-voltage threshold value Vppc can be set to a low value.

In addition, high-temperature region where the switching-device withstanding voltage Vws is high and the ripple-applied normal-time maximum voltage Vsn is also high because the voltage ripple is large, the protection-voltage threshold value Vppc can be set to a high value with which there is no possibility that that erroneous detection stops the operation. Accordingly, it is made possible to obtain the small-size electric-rotating-machine control apparatus 1 that can satisfy both the protection against an excessive voltage and the erroneous-detection prevention, without requiring a cost hike due to upsizing of the component and raising the withstanding voltage of the component.

According to the explanation for foregoing Embodiment 1, in consideration of a rise in the capacitor voltage due to regenerative electric power at a time when an abnormality is caused and the effect of a switching surge, the protection-voltage threshold value Vppc is set to an upper limit value with which the DC-power-source disconnecting time surge voltage Vsco, which is the maximum value of the voltage to be applied to the component, does not exceed the switching-device withstanding voltage corresponding to the obtained temperature of the electric-power conversion circuit 30. However, in the case where in consideration of a rise in the capacitor voltage at a time when an abnormality occurs and the effect of a switching surge, the DC-power-source disconnecting time surge voltage Vsco, which is the maximum value of the voltage to be applied to the component, has a value that does not exceed the switching-device withstanding voltage Vws corresponding to the obtained temperature of the electric-power conversion circuit 30, it does not pose any problem even when the protection-voltage threshold value Vppc is set to a value smaller than the foregoing upper limit value.

In addition, in foregoing Embodiment 1, it is desirable that the temperature of the electric-power conversion circuit 30 to be obtained by the temperature sensor 50 is the temperature of the switching device. Because in general, the heat capacity of a switching device is small, the responsiveness to a temperature change in the electric-rotating-machine control apparatus is high; thus, it is made possible to perform secure protection by use of a temperature detection value. More preferably, it is desirable that the temperature sensor 50 obtains the temperature of the particular switching device whose temperature becomes lowest among the switching devices in the electric-power conversion circuit 30. Because as described above, the lower becomes the temperature of the switching device, the lower the withstanding voltage becomes, the protection is performed based on the lowest-temperature switching device, in terms of protection from an excessive voltage; thus, secure protection against the excessive voltage is made possible.

2. Embodiment 2

<Configuration of Electric-Rotating-Machine Control Apparatus>

Figure 8:
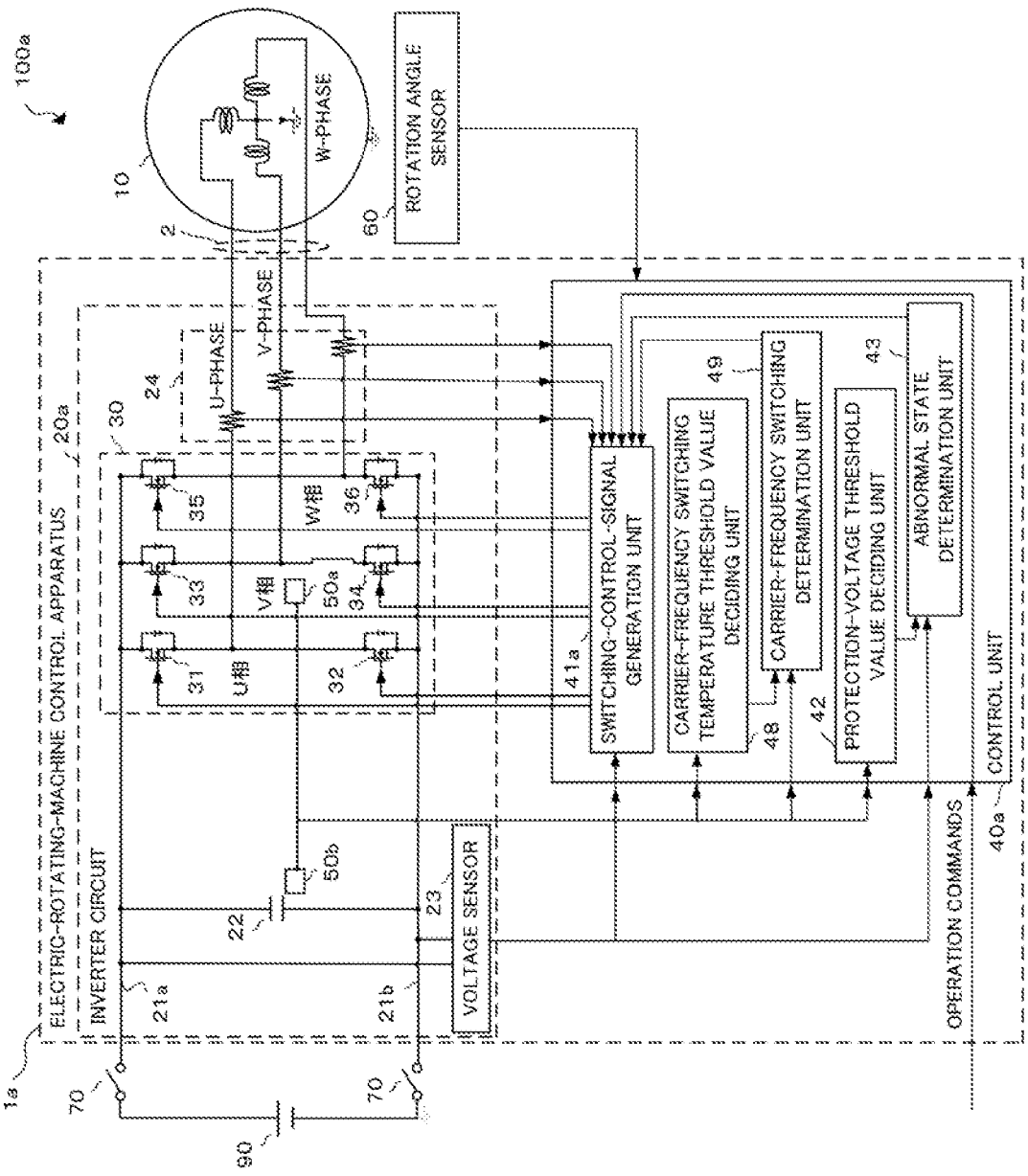
FIG. 8 is a configuration diagram of an electric-rotating-machine control apparatus according to Embodiment 2.

FIG. 8 is a configuration diagram of an electric-rotating-machine control apparatus 1a according to Embodiment 2. In the electric-rotating-machine control apparatus 1 according to Embodiment 1, the protection-voltage threshold value Vppc is decided based on the temperature of the switching device, obtained by the temperature sensor 50, and is compared with the DC bus-bar voltage Vdc, inputted from the voltage sensor 23, so as to determine an abnormal state of the power source side. In contrast, in the electric-rotating-machine control apparatus 1a according to Embodiment 2, the inverter circuit 20a is provided with a temperature sensor 50a for detecting the temperature of the electric-power conversion circuit 30 and a capacitor temperature sensor 50b for detecting the temperature of the capacitor 22. An electric rotating machine apparatus 100a is configured with the whole of the electric-rotating-machine control apparatus 1a and the electric rotating machine 10 that are combined with each other.

The control unit 40a obtains the respective temperatures of the switching device and the capacitor in an independent manner. Embodiment 2 is the same as Embodiment 1 in that the protection-voltage threshold value Vppc is decided based on the temperature of the switching device and an abnormal state of the power source side is determined based on the DC bus-bar voltage Vdc inputted from the voltage sensor 23.

However, Embodiment 2 is different from Embodiment 1 in that the control unit 40a according to Embodiment 2 further detects the temperature of the capacitor 22 by the capacitor temperature sensor 50b and decides a carrier-frequency switching temperature threshold value Tccf, based on the temperature of the capacitor, and in that in the case where the temperature of the switching device becomes lower than the carrier-frequency switching temperature threshold value Tccf, the switching-control-signal generation unit 41a performs control for changing the carrier frequency of the on/off control signals to be outputted to the switching devices 31 through 36 of the electric-power conversion circuit 30.

The operation of the electric-rotating-machine control apparatus 1a according to Embodiment 2 will be explained mainly with regard to the difference from Embodiment 1. In FIG. 8, the DC power source 90 supplies DC electric power to an inverter circuit 20a and is charged with regenerative electric power. A carrier-frequency switching temperature threshold value deciding unit 48 and a carrier-frequency switching determination unit 49 are added to the control unit 40a. The carrier-frequency switching temperature threshold value deciding unit 48 decides the carrier-frequency switching temperature threshold value Tccf, in accordance with the detection value of the capacitor temperature sensor 50b. The carrier-frequency switching determination unit 49 compares a value obtained by the temperature sensor 50a with the carrier-frequency switching temperature threshold value Tccf, determines the necessity of switching the carrier frequency, and then outputs a signal for switching the carrier frequency to the switching-control-signal generation unit 41a.

<Processing for Excessive-Voltage Protection Operation>

Figure 9:
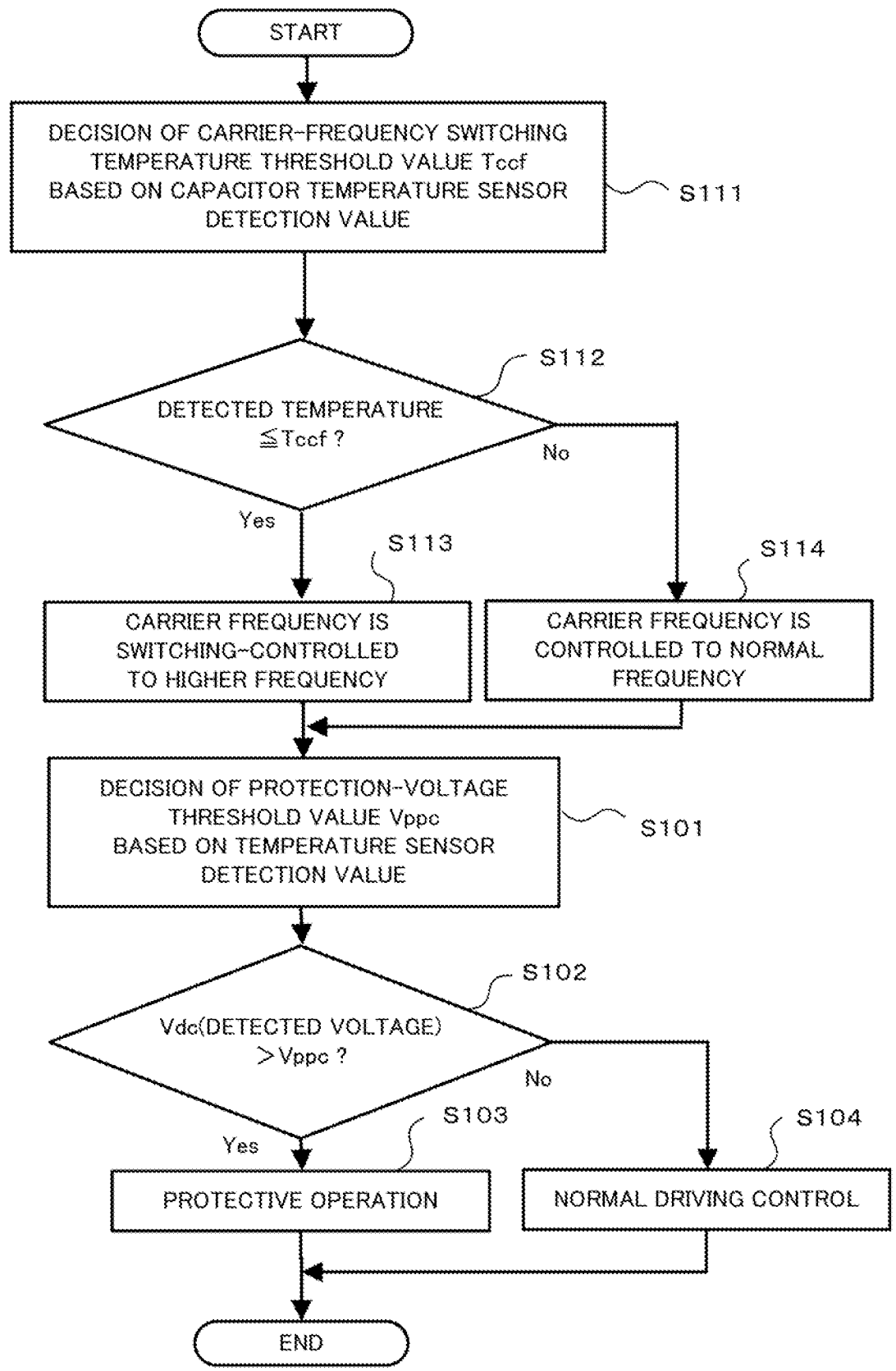
FIG. 9 is a flowchart representing processing by a control unit in the electric-rotating-machine control apparatus according to Embodiment 2.

FIG. 9 is a flowchart representing processing by the control unit 40a of the electric-rotating-machine control apparatus 1a according to Embodiment 2. FIG. 9 represents processing for excessive-voltage protection operation to be executed by the computing processing unit 44 of the control unit 40a. This processing may be executed every predetermined time (e.g., every 1 ms). It may be allowed that the process is executed not every predetermined time but at each time of events such as that A/D conversion of each of the signals detected by the voltage sensor 23, the temperature sensor 50a, and the capacitor temperature sensor 50b is completed.

The flowchart in FIG. 9 is different from the flowchart in FIG. 6 according to Embodiment 1 in that the steps 0100 through S114 are added at a place before the step S101. Only the different points will be explained.

In the step S111 after the start of processing in FIG. 9, the carrier-frequency switching temperature threshold value deciding unit 48 decides the carrier-frequency switching temperature threshold value Tccf. The carrier-frequency switching temperature threshold value Tccf is decided based on a detection value of the capacitor temperature sensor 50b that detects the temperature of the capacitor 22.

In the step S112, it is determined whether or not the temperature detected by the temperature sensor 50a that detects the temperature of the electric-power conversion circuit 30 is the same as or lower than the carrier-frequency switching temperature threshold value Tccf. In the case where the temperature is the same as or lower than the carrier-frequency switching temperature threshold value Tccf (the result of the determination is Yes), the carrier frequency is switching-controlled to a higher frequency in the step S113. Specifically, to the switching-control-signal generation unit 41a, the carrier-frequency switching determination unit 49 outputs an instruction signal for switching the carrier frequency to a higher-frequency side. After that, the step S113 is followed by the step S101.

In the case where the temperature is not the same as or lower than the carrier-frequency switching temperature threshold value Tccf (the result of the determination is No), the carrier frequency is controlled to be a normal frequency in the step S114. Specifically, to the switching-control-signal generation unit 41a, the carrier-frequency switching determination unit 49 outputs an instruction signal for the normal carrier frequency. After that, the step S114 is followed by the step S101. With the determination in the step S112, the determination value may have a hysteresis.

<Function of Control Unit>

Accordingly, the electric-rotating-machine control apparatus 1a according to Embodiment 2 can further downsize an electric-rotating-machine control apparatus and further reduce the cost thereof, while satisfying both the protection against an excessive voltage and the erroneous-detection prevention. Hereinafter, there will be explained the reason why the configuration of Embodiment 2 makes it possible to further downsize an electric-rotating-machine control apparatus and further reduce the cost thereof, while satisfying both the protection against an excessive voltage and the erroneous-detection prevention.

There will be considered the case where the temperature sensor 50 explained in Embodiment 1 is utilized only one in number. The withstanding-voltage performance of the switching device and the magnitude of the voltage ripple on the capacitor 22 are affected by the temperature in an independent manner. When the power source side is in an abnormal state (disconnection of the DC power source 90) where the DC power source 90 cannot be charged with regenerative electric power from the electric rotating machine 10, the switching device is a protection-subject component of the excessive-voltage protection.

When the temperature of the switching device is high, the withstanding voltage Vws is high; thus, the component may not be liable to be broken by an excessive voltage. However, when the temperature of the capacitor 22 is high, the voltage ripple is large; thus, there exists a possibility that erroneous detection stops the operation. Because when the temperature of the switching device is low, the withstanding voltage Vws is low, there exist a possibility that an excessive voltage breaks the component; however, because when the temperature of the capacitor is low, the voltage ripple is small, the operation may not be liable to stop. When the correlation between the temperature of the switching device and the temperature of the capacitor 22 is strong, the protection-voltage threshold value Vppc is appropriately set in accordance with the temperature, so that it is made possible to obtain the small-size electric-rotating-machine control apparatus 1 that can satisfy both the protection against an excessive voltage and the erroneous-detection prevention, without requiring a cost hike due to upsizing of the component and raising the withstanding voltage of the component.

This is established when there exists a strong correlation between the temperature of the switching device and the temperature of the capacitor 22. For example, this cannot be established when there exists a case where no correlation between the temperature of the switching device and the temperature of the capacitor 22 exists and where the temperature of the switching device is low and the temperature of the capacitor 22 becomes high. In many cases, the electric-power conversion circuit 30 including the switching devices and the capacitor 22 in the electric-rotating-machine control apparatus 1 are both mounted in one and the same case, as the inverter circuit 20. In this case, it is conceivable that the case where the correlation between the respective temperatures of the switching device and the capacitor 22 is small is rare.

However, in the case where even when the electric-power conversion circuit and the capacitor are separated from each other and they are mounted in one and the same case, the correlation between their temperatures is weak or the difference between their temperatures is large, there occurs a temperature difference between the switching device and the capacitor. When this fact is considered, designing with a sufficient margin is required. In such a case, there cannot sufficiently be obtained the effect, explained in Embodiment 1, that by appropriately setting the protection-voltage threshold value Vppc in accordance with the temperature of the switching device, there is obtained a small-size electric-rotating-machine control apparatus that can satisfy both the protection against an excessive voltage and the erroneous-detection prevention, without requiring a cost hike due to upsizing of the component and raising the withstanding voltage of the component.

However, in the electric-rotating-machine control apparatus 1a according to the configuration of Embodiment 2, the temperature sensor 50a detects the temperature of the switching device, the capacitor temperature sensor 50b obtains the temperature of the capacitor, and the carrier-frequency switching temperature threshold value deciding unit 48 decides the carrier-frequency switching temperature threshold value Tccf, based on the obtained capacitor temperature.

The carrier-frequency switching determination unit 49 compares the temperature of the switching device, obtained by the temperature sensor 50a, with the carrier-frequency switching temperature threshold value Tccf; in the case where the temperature of the switching device is the same as or lower than the carrier-frequency switching temperature threshold value Tccf, the carrier-frequency switching determination unit 49 outputs a carrier-frequency switching command to the switching-control-signal generation unit 41. When receiving the carrier-frequency switching command from the carrier-frequency switching determination unit 49, the switching-control-signal generation unit 41 raises the carrier frequency of the on/off control signals for controlling the two or more switching devices 31 through 36 included in the electric-power conversion circuit 30.

As represented by the equation (3) in Embodiment 1, the voltage ripple is in proportion to the time integration of the current that flows into the capacitor. Accordingly, raising the carrier frequency reduces the time integration value of the current that flows into the capacitor during the period of the carrier. Thus, raising the carrier frequency makes it possible to reduce the voltage ripple value.

In this situation, as the temperature of the capacitor 22 obtained by the capacitor temperature sensor 50b becomes higher, the carrier-frequency switching temperature threshold value Tccf is set to a higher temperature. More preferably, in the case where the protection-voltage threshold value Vppc is set to the lower limit value thereof, decided by the obtained temperature of the capacitor 22, the carrier-frequency switching temperature threshold value Tccf is set to the lower limit value of the switching-device temperature with which the DC-power-source disconnecting time surge voltage Vsco, which is the maximum value of the voltage to be applied to the switching device, does not exceed the switching-device withstanding voltage Vws, decided by the switching-device temperature, in consideration of a rise in the capacitor voltage due to regenerative electric power at a time when an abnormality is caused and the effect of a switching surge. In other words, there is obtained a switching-device temperature with which the upper limit value of the excessive-voltage threshold value, decided by the switching-device temperature, does not become lower than the lower limit value of the protective-voltage threshold value, decided by the capacitor temperature. Then, the lower limit value of the switching-device temperature is set, as the carrier-frequency switching temperature threshold value Tccf.

<Setting of Carrier-Frequency Switching Temperature Threshold Value>

Figure 10:
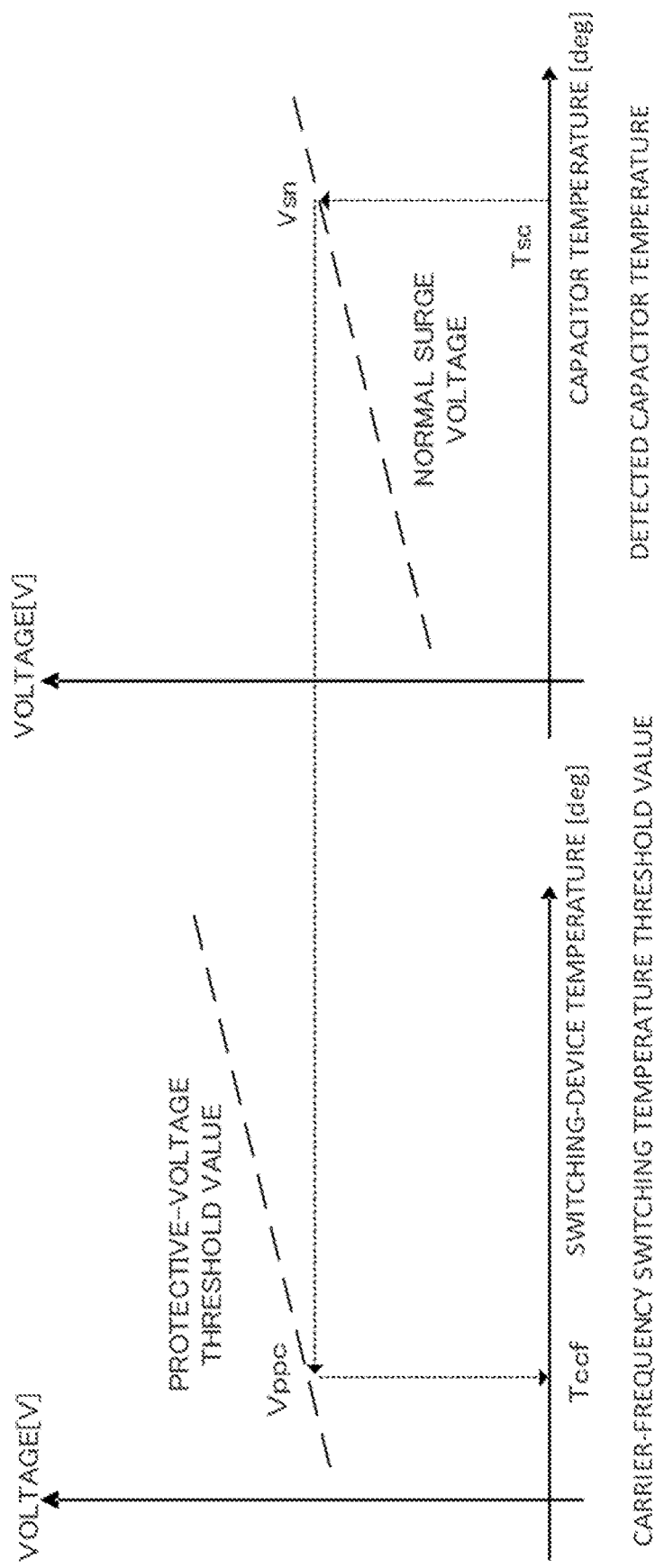
FIG. 10 is a set of graphs representing setting of a carrier-frequency switching temperature threshold value in the electric-rotating-machine control apparatus according to Embodiment 2.

FIG. 10 is a set of graphs representing setting of the carrier-frequency switching temperature threshold value in the electric-rotating-machine control apparatus 1a according to Embodiment 2. As explained in Embodiment 1, the protection-voltage threshold value Vppc is decided from the switching-device withstanding voltage Vws decided by the switching-device temperature, and the lower limit value of the protection-voltage threshold value Vppc (ripple-applied normal-time maximum voltage Vsn) is decided from the magnitude of the voltage ripple caused by the electrostatic capacitance C (normal-time ripple voltage width Vrn).

In this situation, there exists a strong correlation between the switching-device temperature and the capacitor temperature; thus, no problem is posed when the upper limit and the lower limit of the protection-voltage threshold value Vppc are not reversed. However, the case is conceivable where because the switching-device temperature is low and the capacitor temperature is high, the upper limit and the lower limit of the protection-voltage threshold value Vppc are reversed. In such a case, the establishment of both the protection against an excessive voltage and the prevention of the operation stop due to erroneous detection collapses.

In contrast, in Embodiment 2, there is reversely calculated the switching-device temperature at a time when the upper limit value of the protective-voltage threshold value (the protection-voltage threshold value Vppc with which the DC-power-source disconnecting time surge voltage Vsco reaches the switching-device withstanding voltage Vws) coincides with the lower limit value of the protective-voltage threshold value (the ripple-applied normal-time maximum voltage Vsn) decided by an obtained capacitor temperature Tsc; then, the temperature is set, as the carrier-frequency switching temperature threshold value Tccf. As a result, the case where the upper limit and the lower limit of the protection-voltage threshold value Vppc are reversed, i.e., the temperature at which the establishment of both the protection against an excessive voltage and the prevention of the operation stop due to erroneous detection collapses can be determined. Then, at a temperature the same as or lower than that temperature, the lower limit value of the protection-voltage threshold value Vppc (the ripple-applied normal-time maximum voltage Vsn) is lowered by raising the carrier frequency, so that the upper limit and the lower limit of the protection-voltage threshold value Vppc are prevented from being reversed.

That is to say, in the case where although the obtained temperature of the switching device is low and hence the protection-voltage threshold value Vppc to be set to a value with which the switching device can be protected from an excessive voltage is small, the temperature of the capacitor is high and the voltage ripple is large and hence erroneous detection may stop the operation, the voltage ripple is reduced by raising the carrier frequency, so that the erroneous detection can be prevented from stopping the operation.

Such a configuration as described above makes it possible that the switching device is securely protected against an excessive voltage by deciding the protection-voltage threshold value Vppc based on the temperature of the switching device. Simultaneously, because the carrier-frequency switching temperature threshold value Tccf is decided based on the obtained temperature of the capacitor, it is made possible to eliminate the possibility that the ripple-applied normal-time maximum voltage Vsn (the lower limit of the protective-voltage threshold value), including a voltage ripple, that is decided based on the temperature of the capacity exceeds the protection-voltage threshold value Vppc decided based on the temperature of the switching device and hence erroneous detection stops the operation.

In that case, when the temperature of the switching device is the same as or lower than the carrier-frequency switching temperature threshold value Tccf, the voltage ripple is reduced by raising the carrier frequency, so that erroneous detection is prevented from stopping the operation. Accordingly, it is made possible in wider range to satisfy both the secure protection against an excessive voltage and the prevention of the operation from being stopped by erroneous detection.

As described above, in the electric-rotating-machine control apparatus 1a according to Embodiment 2, the protection-voltage threshold value Vppc is set in accordance with the temperature of the switching device, and the carrier-frequency switching temperature threshold value Tccf can be set in accordance with the temperature of the capacity. Accordingly, when the obtained temperature of the switching device is the same as or lower than the carrier-frequency switching temperature threshold value Tccf, the carrier frequency can be raised. As a result, in addition to the effect explained in Embodiment 1, it is made possible that even when the correlation between the temperature of the switching device and the temperature of the capacitor is weak or the difference between the respective temperatures thereof is large, the protection against an excessive voltage and the prevention of the operation from being stopped by erroneous detection can securely be performed. Accordingly, it is made possible to obtain an electric-rotating-machine control apparatus having a further smaller size that can satisfy both the protection against an excessive voltage and the erroneous-detection prevention, without requiring a cost hike due to an excessive margin, upsizing of the component, and raising the withstanding voltage of the component.

In the explanation in Embodiment 2, in the case where the protection-voltage threshold value Vppc is set to the lower limit value thereof, decided by the obtained temperature of the capacitor, the carrier-frequency switching temperature threshold value Tccf is set to the lower limit value of the switching-device temperature with which the maximum value of the voltage to be applied to the switching device does not exceed the switching-device withstanding voltage that changes depending on the switching-device temperature, in consideration of a rise in the capacitor voltage due to regenerative electric power at a time when an abnormality is caused and the effect of a switching surge. However, when the switching-device temperature is the one with which the maximum value of the voltage to be applied to the switching device does not exceed the switching-device withstanding voltage that changes depending on the switching-device temperature, it does not pose any problem to set the carrier-frequency switching temperature threshold value Tccf to a switching-device temperature that is higher than the foregoing lower limit value.

In addition, in Embodiment 2, it is desirable that as the temperature of the capacitor to be obtained by the temperature sensor 50, the temperature of a portion whose temperature becomes highest in the capacitor is obtained. Because as described above, the higher becomes the temperature of the capacitor, the lower the electrostatic capacitance C becomes, the protection is performed based on the highest-temperature portion of the capacitor, in terms of prevention of erroneous detection; thus, secure protection against the erroneous detection is made possible.

Moreover, even in the case where as the electric-rotating-machine control apparatus 1a according to Embodiment 1, the capacitor temperature sensor 50b is omitted and both the switching-device temperature and the capacitor temperature are detected by the temperature sensor 50, it may be allowed that the carrier-frequency switching temperature threshold value Tccf is set to a predetermined fixed value and that at a temperature the same as or lower the foregoing carrier-frequency switching temperature threshold value Tccf, the carrier frequency is raised. Accordingly, because the width of the ripple voltage caused by switching of the switching device can be reduced, the ripple-applied normal-time maximum voltage Vsn can be lowered. In addition, because the protection-voltage threshold value Vppc can be lowered in the temperature region, it is made possible that the abnormality in the DC voltage is detected earlier and hence the protective operation is rapidly started. As a result, the maximum voltage to be applied to the DC bus-bar of the inverter circuit 20 can be lowered. Thus, it can be prevented in good time that the DC bus-bar voltage Vdc reaches the switching-device withstanding voltage Vws.

In the present embodiment, based on the capacitor temperature detected by the capacitor temperature sensor 50b, the carrier-frequency switching temperature threshold value Tccf is set to the switching-device temperature, specified as a temperature at which the establishment of both the protection against an excessive voltage and the prevention of the operation stop due to erroneous detection collapses; then, in the case where the switching-device temperature detected by the temperature sensor 50a becomes the same as or lower than the carrier-frequency switching temperature threshold value Tccf, the carrier frequency is raised. However, it may be allowed that based on the switching-device temperature detected by the temperature sensor 50a, a carrier-frequency switching capacitor-temperature threshold value Tccfc is set to the capacitor temperature, specified as a temperature at which the establishment of both the protection against an excessive voltage and the prevention of the operation stop due to erroneous detection collapses; then, in the case where the capacitor temperature detected by the capacitor temperature sensor 50b becomes the same as or higher than the carrier-frequency switching capacitor-temperature threshold value Tccfc, the carrier frequency is raised (the carrier-frequency switching capacitor-temperature threshold value Tccfc is not represented).

<Wide Bandgap Semiconductor Device>

The type of each of the switching devices 31 through 36 applied to the electric-power conversion circuit 30 is not particularly specified; for example, a wide bandgap semiconductor can be utilized. As the wide bandgap semiconductor device, for example, the one formed of a silicon carbide (SiC), a gallium-nitride (GaN)-based material, or a diamond (C) can be utilized.

In comparison with an inverter circuit including conventional switching devices each formed of silicon (Si), an inverter circuit including switching devices each formed of such a wide bandgap semiconductor is characterized by having a high withstanding voltage, by being low-loss, and by allowing high-frequency drive. Hereinafter, the inverter circuit including switching devices each formed of a wide bandgap semiconductor will be referred to as a wide bandgap inverter circuit, and the inverter circuit including switching devices each formed of silicon (Si) will be referred to as a silicon inverter circuit.

The switching device in an electric-rotating-machine control apparatus utilizing the wide bandgap inverter circuit has a high withstanding voltage, in comparison with the switching device in an electric-rotating-machine control apparatus utilizing the silicon inverter circuit. Accordingly, a capacitor of high-withstanding-voltage specification is utilized. In general, there exists a tendency that the higher is the withstanding voltage of the capacitor, the larger the size for the electrostatic capacitance C becomes. Therefore, the electric-rotating-machine control apparatus, according to the present disclosure, that requires no increase in the capacitance of the capacitor provides large benefit.

Moreover, the switching speed in an electric-rotating-machine control apparatus utilizing the wide bandgap inverter circuit can be made high, in comparison with the switching speed in an electric-rotating-machine control apparatus utilizing the silicon inverter circuit. However, as the switching speed becomes higher, the surge voltage becomes larger. Accordingly, in order to protect the switching device from a surge voltage, it is required to utilize the electric-rotating-machine control apparatus with a limited switching speed.

In order to raise the switching speed, for example, the maximum voltage to be applied to the switching device is reduced at a time when the protection of the switching device is performed, by increasing the electrostatic capacitance C so as to expand the setting range of the protection-voltage threshold value Vppc. In contrast, in the electric-rotating-machine control apparatus according to the present disclosure, the switching speed can be raised without increasing the electrostatic capacitance C of the capacitor, so that the performance of the wide bandgap inverter circuit, in which the switching speed can be raised, can sufficiently be extracted. Moreover, raising the switching speed also makes it possible to reduce the switching loss that is caused at a time of switching. Accordingly, the efficiency of the driving can be made higher, and it is also made possible to downsize the switching device through reduction of heat-generation amount. As a result, it is made possible to further downsize the electric-rotating-machine control apparatus and to reduce the cost thereof.

In addition, each of foregoing Embodiments 1 and 2 represents nothing but an example; the electric-rotating-machine control apparatus is not limited to the foregoing Embodiments, as long as the present disclosure can be applied thereto. For example, in each of foregoing Embodiments 1 and 2, there has been explained the case where the DC power source 90 and the electric-rotating-machine control apparatus 1 are directly connected with each other; however, it may be allowed that a DC/DC converter for increasing or decreasing a voltage is disposed between the DC power source 90 and the electric-rotating-machine control apparatus 1. Moreover, it may be allowed that the electric-rotating-machine control apparatus 1 is connected with an AC power source through the intermediary of a rectifier for converting AC electric power of the AC power source into DC electric power or an AC/DC converter.

In addition, in each of foregoing Embodiments 1 and 2, as abnormality-countermeasure processing for charging the capacitor 22 with no regenerative electric power, there has been explained the 6-switch opening processing for turning off all the switching devices 31 through 36 in the electric-power conversion circuit 30. However, it may be allowed that there is performed the three-phase short-circuiting processing in which, for example, all the upper-side switching devices or all the lower-side switching devices of the electric-power conversion circuit 30 are turned on so that the respective phases of the electric rotating machine are short-circuited and hence the capacitor is made to regenerate no electric power.

In addition, in each of foregoing Embodiments 1 and 2, as the electric rotating machine 10, a three-phase synchronous electric rotating machine has been explained. However, it may be allowed that a two-phase electric rotating machine or an electric rotating machine having four or more phases is the subject.

In addition, in each of foregoing Embodiments 1 and 2, the respective temperatures of the switching device and the capacitor are obtained by use of corresponding one of the temperature sensors 50 and 50a and the capacitor temperature sensor 50b. However, as the method of obtaining the component temperatures, it may be allowed that the respective temperatures are detected by use of two temperature sensors or that the temperature of the one of the components is detected by use of a single temperature sensor and then the temperature of the other one thereof is calculated based on the value of the foregoing temperature. In addition, it may be allowed that the temperature of another portion is obtained and then the temperature of the component is calculated based on the value of the foregoing temperature. In addition, it may be allowed that there is utilized a predetermined component-temperature estimation value corresponding to the driving state of the electric rotating machine 10, the electric-rotating-machine control apparatuses 1, or the electric-rotating-machine control apparatus 1a. It may be allowed that two or more temperature sensors are utilized and the lowest temperature, the highest temperature, or the average value is utilized.

In addition, each of foregoing Embodiments 1 and 2 has been explained with an electric automobile, as an example; however, each of foregoing Embodiments 1 and 2 may be applied to a hybrid vehicle that utilized both an engine and an electric rotating machine. In addition, application of the electric rotating machine apparatus is not limited to a vehicle.

Although the present application is described above in terms of various exemplary embodiments and implementations, it should be understood that the various features, aspects and functions described in one or more of the individual embodiments are not limited in their applicability to the particular embodiment with which they are described, but instead can be applied, alone or in various combinations to one or more of the embodiments. Therefore, an infinite number of unexemplified variant examples are conceivable within the range of the technology disclosed in the specification of the present disclosure. For example, at least one of the constituent components may be modified, added, or eliminated; moreover, at least one of the constituent components mentioned in at least one of the preferred embodiments may be selected and combined with the constituent components mentioned in another preferred embodiment.

Hereinafter, respective features disclosed in the present disclosure will collectively be described as appendixes.

(Appendix 1) An electric-rotating-machine control apparatus comprising:
  an electric-power conversion circuit having two or more legs in each of which there are provided a positive-polarity switching device connected with a positive electrode of a DC power source, a negative-polarity switching device connected with a negative electrode of the DC power source, and an external connection point at which the positive-polarity switching device and the negative-polarity switching device are connected in series with each other and that is connected with an electric rotating machine;
  a capacitor connected with the positive electrode and the negative electrode of the electric-power conversion circuit;
  a voltage sensor for detecting a voltage between the positive electrode and the negative electrode of the electric-power conversion circuit;
  a temperature sensor for detecting a temperature of the electric-power conversion circuit; and
  a control unit for on/off-controlling the switching devices in the electric-power conversion circuit,
  wherein in the case where a voltage detected by the voltage sensor is higher than a determination voltage calculated based on a temperature detected by the temperature sensor, the control unit performs protective control in which all the switching devices are turned off, all the positive-polarity switching devices are turned on and all the negative-polarity switching devices are turned off, or all the positive-polarity switching devices are turned off and all the negative-polarity switching devices are turned on.

(Appendix 2) The electric-rotating-machine control apparatus according to Appendix 1, wherein the control unit is set in such a way as to increase the determination voltage, as a temperature detected by the temperature sensor rises.

(Appendix 3) The electric-rotating-machine control apparatus according to any one of Appendixes 1 and 2, wherein the determination voltage of the control unit is set in such a way that a voltage, to be applied to each of the switching devices in a time from a time point when the voltage sensor detects a voltage higher than the determination voltage to a time point when the protective control is performed, becomes lower than a withstanding voltage of the switching device at a temperature detected by the temperature sensor.

(Appendix 4) The electric-rotating-machine control apparatus according to any one of Appendixes 1 and 2, wherein the determination voltage of the control unit is set in such a way that in the case where the DC power source is disconnected from the electric-power conversion circuit while the electric rotating machine is rotating, a voltage, to be applied between terminals of each of the switching devices in a time from a time point when the voltage sensor detects a voltage higher than the determination voltage to a time point when the protective control is performed, becomes lower than a withstanding voltage of the switching device at a temperature detected by the temperature sensor.

(Appendix 5) The electric-rotating-machine control apparatus according to Appendix 4, wherein the determination voltage of the control unit is set in such a way that in the case where the DC power source is disconnected from the electric-power conversion circuit while the electric rotating machine is rotating, a voltage, to be applied between terminals of each of the switching devices, to which surge voltages generated by turning on/off the switching devices are applied, in a time from a time point when the voltage sensor detects a voltage higher than the determination voltage to a time point when the protective control is performed, becomes a maximum value within a range under a withstanding voltage of the switching device at a temperature detected by the temperature sensor.

(Appendix 6) The electric-rotating-machine control apparatus according to any one of Appendixes 1 through 5, wherein the temperature sensor detects a temperature of the switching device.

(Appendix 7) The electric-rotating-machine control apparatus according to any one of Appendixes 1 through 6, wherein the temperature sensor detects a temperature of the switching device whose temperature becomes lowest in the electric-power conversion circuit.

(Appendix 8) The electric-rotating-machine control apparatus according to any one of Appendixes 1 through 7, further comprising a capacitor temperature sensor that detects a temperature of the capacitor, wherein the control unit calculates the determination voltage, based on a temperature detected by the temperature sensor and a capacitor temperature detected by the capacitor temperature sensor.

(Appendix 9) The electric-rotating-machine control apparatus according to any one of Appendixes 1 through 8, wherein in the case where a temperature detected by the temperature sensor is the same as or lower than a predetermined determination temperature, the control unit raises a carrier frequency of on/off-control of the switching device in the electric-power conversion circuit.

(Appendix 10) The electric-rotating-machine control apparatus according to Appendix 9, further comprising a capacitor temperature sensor that detects a temperature of the capacitor, wherein the control unit raises the determination temperature, as a capacitor temperature detected by the capacitor temperature sensor rises.

(Appendix 11) The electric-rotating-machine control apparatus according to Appendix 10, wherein the determination temperature of the control unit is set in such a way that when from a capacitance of the capacitor estimated based on the capacitor temperature, a ripple voltage caused by switching at a time when the electric-power conversion circuit normally operates is calculated, a maximum value of the ripple voltage becomes lower than the determination voltage.

(Appendix 12) The electric-rotating-machine control apparatus according to Appendix 11, wherein the determination temperature of the control unit is set to be a lowest temperature within a range where when from a capacitance of the capacitor estimated based on the capacitor temperature, a ripple voltage caused by switching at a time when the electric-power conversion circuit normally operates is calculated, a maximum value of the ripple voltage becomes lower than the determination voltage.

(Appendix 13) The electric-rotating-machine control apparatus according to any one of Appendixes 8 and 10 through 12, wherein the temperature sensor detects a temperature of a portion whose temperature becomes highest in the capacitor.

(Appendix 14) The electric-rotating-machine control apparatus according to any one of Appendixes 1 through 13, wherein the capacitor is a film capacitor in which polypropylene is utilized as a dielectric.

(Appendix 15) The electric-rotating-machine control apparatus according to any one of Appendixes 1 through 14, wherein as the switching device of the electric-power conversion circuit, a wide bandgap semiconductor is utilized.

What is claimed is:

1. An electric-rotating-machine control apparatus comprising:
   an electric-power conversion circuit having two or more legs in each of which there are provided a positive-polarity switching device connected with a positive electrode of a DC power source, a negative-polarity switching device connected with a negative electrode of the DC power source, and an external connection point at which the positive-polarity switching device and the negative-polarity switching device are connected in series with each other and that is connected with an electric rotating machine;
   a capacitor connected with the positive electrode and the negative electrode of the electric-power conversion circuit;
   a voltage sensor for detecting a voltage between the positive electrode and the negative electrode of the electric-power conversion circuit;
   a temperature sensor for detecting a temperature of the electric-power conversion circuit; and
   a controller for on/off-controlling the switching devices in the electric-power conversion circuit,
   wherein in the case where a voltage detected by the voltage sensor is higher than a determination voltage calculated based on a temperature detected by the temperature sensor, the controller performs protective control in which all the switching devices are turned off, all the positive-polarity switching devices are turned on and all the negative-polarity switching devices are turned off, or all the positive-polarity switching devices are turned off and all the negative-polarity switching devices are turned on.

2. The electric-rotating-machine control apparatus according to claim 1, wherein the controller is set in such a way as to increase the determination voltage, as a temperature detected by the temperature sensor rises.

3. The electric-rotating-machine control apparatus according to claim 1, wherein the determination voltage of the controller is set in such a way that a voltage, to be applied to each of the switching devices in a time from a time point when the voltage sensor detects a voltage higher than the determination voltage to a time point when the protective control is performed, becomes lower than a withstanding voltage of the switching device at a temperature detected by the temperature sensor.

4. The electric-rotating-machine control apparatus according to claim 1, wherein the determination voltage of the controller is set in such a way that in the case where the DC power source is disconnected from the electric-power conversion circuit while the electric rotating machine is rotating, a voltage, to be applied between terminals of each of the switching devices in a time from a time point when the voltage sensor detects a voltage higher than the determination voltage to a time point when the protective control is performed, becomes lower than a withstanding voltage of the switching device at a temperature detected by the temperature sensor.

5. The electric-rotating-machine control apparatus according to claim 4, wherein the determination voltage of the controller is set in such a way that in the case where the DC power source is disconnected from the electric-power conversion circuit while the electric rotating machine is rotating, a voltage, to be applied between terminals of each of the switching devices, to which surge voltages generated by turning on/off the switching devices are applied, in a time from a time point when the voltage sensor detects a voltage higher than the determination voltage to a time point when the protective control is performed, becomes a maximum value within a range under a withstanding voltage of the switching device at a temperature detected by the temperature sensor.

6. The electric-rotating-machine control apparatus according to claim 1, wherein the temperature sensor detects a temperature of the switching device.

7. The electric-rotating-machine control apparatus according to claim 1, wherein the temperature sensor detects a temperature of the switching device whose temperature becomes lowest in the electric-power conversion circuit.

8. The electric-rotating-machine control apparatus according to claim 1, further comprising a capacitor temperature sensor that detects a temperature of the capacitor, wherein the controller calculates the determination voltage, based on a temperature detected by the temperature sensor and a capacitor temperature detected by the capacitor temperature sensor.

9. The electric-rotating-machine control apparatus according to claim 8, wherein the temperature sensor detects a temperature of a portion whose temperature becomes highest in the capacitor.

10. The electric-rotating-machine control apparatus according to claim 1, wherein in the case where a temperature detected by the temperature sensor is the same as or lower than a predetermined determination temperature, the controller raises a carrier frequency of on/off-control of the switching device in the electric-power conversion circuit.

11. The electric-rotating-machine control apparatus according to claim 10, further comprising a capacitor temperature sensor that detects a temperature of the capacitor, wherein the controller raises the determination temperature, as a capacitor temperature detected by the capacitor temperature sensor rises.

12. The electric-rotating-machine control apparatus according to claim 11, wherein the determination temperature of the controller is set in such a way that when from a capacitance of the capacitor estimated based on the capacitor temperature, a ripple voltage caused by switching at a time when the electric-power conversion circuit normally operates is calculated, a maximum value of the ripple voltage becomes lower than the determination voltage.

13. The electric-rotating-machine control apparatus according to claim 12, wherein the determination temperature of the controller is set to be a lowest temperature within a range where when from a capacitance of the capacitor estimated based on the capacitor temperature, a ripple voltage caused by switching at a time when the electric-power conversion circuit normally operates is calculated, a maximum value of the ripple voltage becomes lower than the determination voltage.

14. The electric-rotating-machine control apparatus according to claim 1, wherein the capacitor is a film capacitor in which polypropylene is utilized as a dielectric.

15. The electric-rotating-machine control apparatus according to claim 1, wherein as the switching device of the electric-power conversion circuit, a wide bandgap semiconductor is utilized.

* * * * *